(12) United States Patent
Imamura et al.

(10) Patent No.: US 7,604,884 B2
(45) Date of Patent: Oct. 20, 2009

(54) FUEL CELL SYSTEM

(75) Inventors: Tomonori Imamura, Kariya (JP); Akimasa Osaki, Susono (JP)

(73) Assignee: Denso Corporation, Kariya (JP)

( * ) Notice: Subject to any disclaimer, the term of this patent is extended or adjusted under 35 U.S.C. 154(b) by 961 days.

(21) Appl. No.: 10/704,657

(22) Filed: Nov. 12, 2003

(65) Prior Publication Data
US 2004/0101724 A1     May 27, 2004

(30) Foreign Application Priority Data

Nov. 21, 2002 (JP) .............................. 2002-338301
Sep. 29, 2003 (JP) .............................. 2003-336941

(51) Int. Cl.
*H01M 8/04* (2006.01)
(52) U.S. Cl. .......................................... 429/22; 429/23
(58) Field of Classification Search .................. 429/12, 429/13, 22, 23
See application file for complete search history.

(56) References Cited

U.S. PATENT DOCUMENTS

2001/0055705 A1* 12/2001 Yagi .............................. 429/23

FOREIGN PATENT DOCUMENTS

| JP | 09-027336 | * | 1/1997 |
| JP | A 9-27336 | | 1/1997 |
| JP | A 11-191424 | | 7/1999 |
| JP | A 2001-345114 | | 12/2001 |

* cited by examiner

*Primary Examiner*—Patrick Ryan
*Assistant Examiner*—Monique Wills
(74) *Attorney, Agent, or Firm*—Oliff & Berridge, PLC

(57) ABSTRACT

A fuel cell generates electric power based on electrochemical reaction of reaction gases. A gas feed stopping device stops the feed of reaction gases into the fuel cell. At the time the power generation by the fuel cell is terminated, the fuel cell continues power generation for a while under a condition that the feed of one of the reaction gases is stopped by the gas feed stopping means. With this operation, the residual reaction gas in the fuel cell is consumed smoothly while the fuel cell continues power generation after the feed of one reaction gas is stopped. The electric potential of a cathode electrode decreases promptly. Deterioration of the cathode electrode is surely prevented.

14 Claims, 14 Drawing Sheets

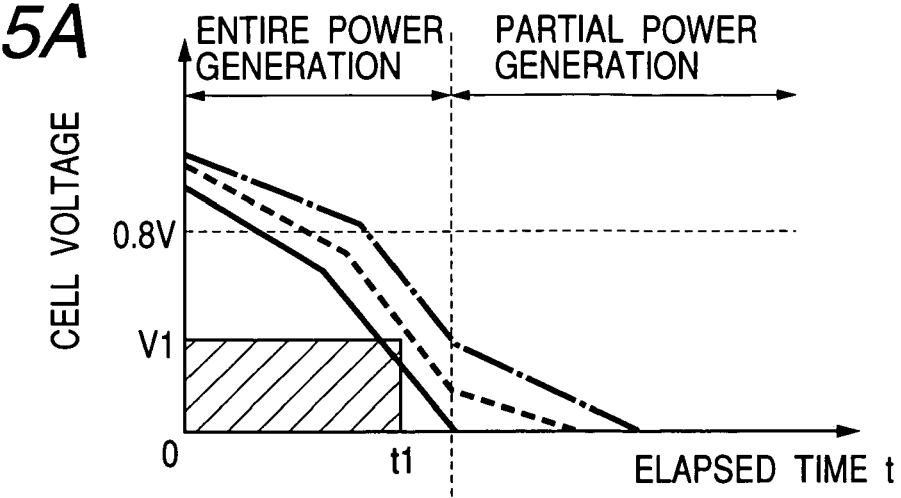
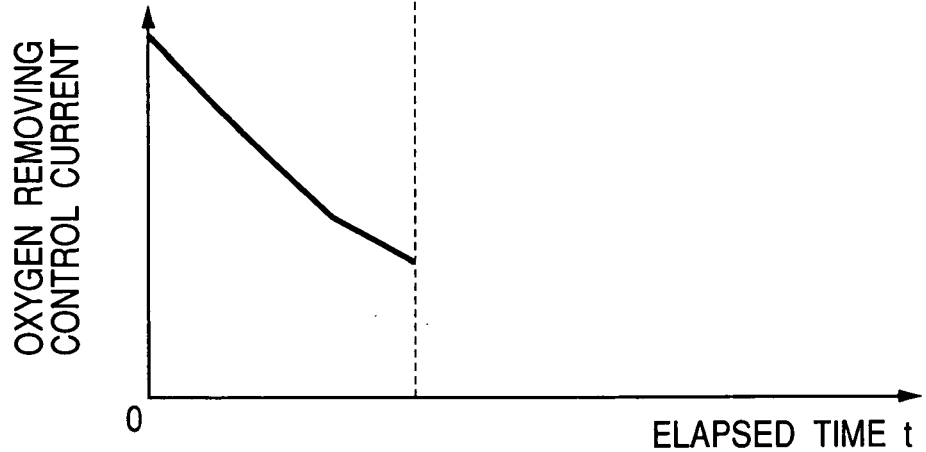
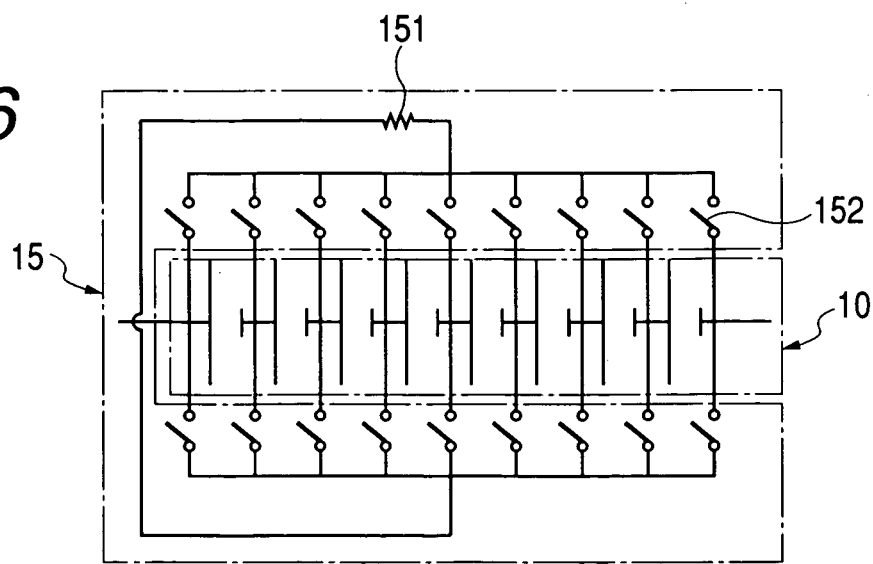

FUEL CELL SYSTEM

BACKGROUND OF THE INVENTION

This invention relates to a fuel cell system including a fuel cell capable of generating electric energy based on chemical reaction of hydrogen and oxygen. This invention is effectively applicable to automotive vehicles, marine vessels, portable power generators and other mobile devices.

When the operation of a fuel cell system is stopped without purging the hydrogen or the oxygen remaining in a fuel cell, the electrode potential of a cathode rises. This induces carbon oxidization reaction and accordingly the cathode electrode extinguishes and deteriorates. Furthermore, reaction gas remaining in a fuel cell may leak via an electrolyte membrane to an opposite electrode. This is a so-called crossleak phenomenon that induces abnormal heat generation and accordingly may damage a catalyst. To prevent this drawback, it is general to carry out purge of the hydrogen or the oxygen remaining in the fuel cell when the operation of the fuel cell system is stopped.

Furthermore, in a fuel cell system installed on an automotive vehicle, it is conventionally known that a discharge resistor is used to consume electric power of the fuel cell when a key switch is switched from an ON position to an OFF position and accordingly the operation of the fuel cell system is stopped, thereby letting the fuel cell system continue power generation so as to remove at least one of the hydrogen and the oxygen. (For example, refer to the Japanese Patent Application Laid-open No. 2001-345114 corresponding to the United States Patent Application Pub. No. US2001/0055705A1)

However, the purge system generally requires providing an inactive gas tank for the purge and accordingly may not be effectively employed for the mobile devices due to difficulty in installation.

According to the fuel cell system disclosed in the above-described Japanese Patent Application Laid-open No. 2001-345114, it may be possible to prevent the cathode electrode from deteriorating when the key switch is switched to the OFF position. However, the feed of electric power from the fuel cell to an electric motor serving as a vehicle driving source is unnecessary when a traveling vehicle is decelerating or the vehicle is stopped to wait for a traffic signal. In such cases, the voltage level of the fuel cell will be close to an open electric potential. This will promote the deterioration.

SUMMARY OF THE INVENTION

In view of the above-described problems of the prior art, the present invention has a primary object to prevent or suppress the cathode electrode from deteriorating due to adverse influence given from the reaction gas remaining in the fuel cell when the power generation is stopped.

Furthermore, the present invention has another object to diagnose the so-called crossleak phenomenon according to which the reaction gas leaks via an electrolyte membrane to an opposite electrode.

In order to accomplish the above and other related objects, the present invention provides a fuel cell system including a fuel cell for generating electric power based on electrochemical reaction of an oxidizing gas chiefly containing oxygen and a fuel gas chiefly containing hydrogen, gas feed stopping means for stopping feed of the oxidizing gas or the fuel gas supplied to the fuel cell, and electrically driven accessories relating to the operation of the fuel cell. According to this fuel cell system, at a time power generation by the fuel cell is terminated, electric energy generated by the fuel cell is consumed in the accessories under a condition that feed of at least one of the oxidizing gas and the fuel gas is stopped by the gas feed stopping means.

According to this arrangement, even when a secondary cell is in a fully charged condition, the accessories consume electric energy. Thus, it becomes possible to consume the residual reaction gas remaining in the fuel cell. As a result, it becomes possible to prevent or suppress the cathode electrode from deteriorating.

Another aspect of the present invention provides a fuel cell system which includes a fuel cell including a plurality of cells or cell groups for generating electric power based on electrochemical reaction of an oxidizing gas chiefly containing oxygen and a fuel gas chiefly containing hydrogen, gas feed stopping means for stopping feed of the oxidizing gas or the fuel gas supplied to the fuel cell fuel, and electric power storage means for storing electric energy. According to this fuel cell system, at a time power generation by the fuel cell is terminated, power generation by the fuel cell is carried out under a condition that feed of at least one of the oxidizing gas and the fuel gas is stopped by the gas feed stopping means. Electric energy generated by the fuel cell is stored in the electric power storage means. And, storing the electric energy generated by the fuel cell into the electric power storage means is stopped when at least one cell or cell group of the plurality of cells or cell groups is equal to or less than a predetermined voltage.

By the way, the power generation may not be stopped even if the voltage level of one or some cells decreases below a predetermined voltage. In this case, power generable cells other than the above low voltage cells will continuously supply a significant amount of current and this current may damage the low voltage cells. However, according to the above described arrangement, when a low voltage cell is present, storing the electric energy into the electric power storage means is stopped and the power generation by the fuel cell is stopped. Thus, it becomes possible to prevent the low voltage cell from being damaged.

Preferably, the fuel cell includes a plurality of cells or cell groups, and consuming the electric energy of the fuel cell by the accessories is stopped when at least one cell or cell group of the plurality of cells or cell groups becomes equal to or less than a predetermined voltage.

With this arrangement, when a low voltage cell is present, consuming the electric energy by the accessories is stopped and the power generation by the fuel cell is stopped. Thus, it becomes possible to prevent the low voltage cell from being damaged.

Preferably, the fuel cell includes a plurality of cells or cell groups. An electric resistor connectable to the fuel cell is provided independently for each cell or cell group of the fuel cell, and the electric resistor consumes the electric energy generated by the fuel cell under a condition that feed of gas is stopped.

With this arrangement, the residual reaction gas remaining in the fuel cell is consumed effectively so as to prevent or suppress the cathode electrode from deteriorating.

Preferably, the fuel cell includes a plurality of cells or cell groups. An electric resistor connectable to the fuel cell is provided. The electric resistor includes one electric resistor being selectively connectable between at least two cells or cell groups of the fuel cell. The electric resistor consumes the electric energy generated by the fuel cell under a condition that feed of gas is stopped.

With this arrangement, the residual reaction gas remaining in the fuel cell is consumed effectively so as to prevent or suppress the cathode electrode from deteriorating.

Preferably, the fuel cell includes a plurality of cells or cell groups. An electric resistor connectable to the fuel cell is provided. When at least one cell or cell group of the plurality of cells or cell groups is unable to generate electric power, electric energy generated by other cells or cell groups is consumed by the electric resistor.

With this arrangement, even when the fuel cell as a whole cannot generate electric power, the residual reaction gas remaining in the fuel cell is consumed effectively so as to prevent or suppress the cathode electrode from deteriorating.

Furthermore, according to the present invention, it is preferable to provide a voltage measuring means for detecting a voltage of each cell or cell group when power generation is carried out under a condition that feed of gas is stopped. And, a diagnosing means is provided for storing voltage information of each cell or cell group detected by the voltage measuring means and for diagnosing the crossleak of each cell or cell group based on aging phenomenon appearing on the voltage characteristics of each cell or cell group.

When the crossleak appears, the crossleak induces or promotes the consumption of the reaction gas in the fuel cell. Accordingly, when the crossleak appears, the voltage decreases promptly by the amount corresponding to the crossleak. Hence, the above arrangement makes it possible to diagnose the crossleak appearing in the cell. Furthermore, as the diagnosis is performed every time the power generation by the fuel cell is terminated. Hence, it becomes possible to detect the crossleak at an earlier time.

Furthermore, it is possible to diagnose the crossleak of the cell based on the voltage characteristics of each cell or cell group which represents a voltage change relative to a specific current change pattern. Alternatively, it is possible to diagnose the crossleak of the cell or cell group based on a judgment as to whether or not the voltage of each cell or cell group decreases below a predetermined value within a predetermined time when power generation is carried out under a condition that feed of at least one of the oxidizing gas and the fuel gas is stopped.

Furthermore, based on the result of past diagnoses being carried out predetermined times, it is possible to obtain a probability as to whether or not the voltage of each cell or cell group decreases below the predetermined value within the predetermined time when power generation is carried out under a condition that feed of gas is stopped. Then, the diagnosis of the crossleak of the cell or cell group is carried out based on the obtained probability.

Furthermore, it is preferable to issue a warning when occurrence of the crossleak is identified.

Moreover, according to another aspect of the present invention, a fuel cell system is installed in an automotive vehicle which includes a fuel cell for generating electric power based on electrochemical reaction of an oxidizing gas chiefly containing oxygen and a fuel gas chiefly containing hydrogen, and an electric motor receiving the electric power generated by the fuel cell for generating a driving force of a traveling vehicle, in which traveling of the vehicle is allowed when a key switch of the vehicle is in an ON position, and traveling of the vehicle is prohibited when the key switch is in an OFF position.

This fuel cell system includes gas feed stopping means and system control means. The gas feed stopping means stops feed of the oxidizing gas or the fuel gas to the fuel cell. The system control means judges as to whether the power generation of the fuel cell is required or not based on the position of the key switch and the traveling condition of the vehicle, and controls the operation of the gas feed stopping means as well as the power generation by the fuel cell.

The system control means causes the fuel cell to generate electric power until the voltage of the fuel cell becomes equal to or less than a power generation stop target voltage under a condition that feed of at least one of the oxidizing gas and the fuel gas is stopped by the gas feed stopping means, when the key switch is switched from the ON position to the OFF position, and when the key switch is in the ON position and the power generation by the fuel cell is judged as being unnecessary.

With this arrangement, not only when the key switch is switched from the ON position to the OFF position but also when the power generation by the fuel cell is judged as being unnecessary even when the key switch is in the ON position (for example, when the traveling vehicle is decelerating or when the vehicle is stopped to wait for a traffic signal), it becomes possible to consume the residual reaction gas remaining in the fuel cell, thereby preventing or suppressing the cathode electrode from deteriorating.

Preferably, electric power storage means for storing electric energy is provided, and the electric energy generated by the fuel cell is stored in the electric power storage means under a condition that feed of the gas is stopped.

With this arrangement, the electric energy can be stored without loss and accordingly it becomes possible to practically use the residual reaction gas remaining in the fuel cell.

Preferably, electrically driven accessories relating to the operation of the fuel cell are provided, and the electric energy generated by the fuel cell is consumed by the accessories under a condition that feed of the gas is stopped.

With this arrangement, even when a secondary cell is in a fully charged condition, the accessories consume electric energy. Thus, it becomes possible to consume the reaction gas remaining in the fuel cell. As a result, it becomes possible to prevent or suppress the cathode electrode from deteriorating.

Preferably, an air-conditioning apparatus for air-conditioning a compartment of the vehicle is installed in the vehicle. The air-conditioning apparatus includes an electrically driven coolant compressor for compressing and discharging the coolant. And, the electric energy generated by the fuel cell is consumed by the coolant compressor under a condition that feed of the gas is stopped.

With this arrangement, even when a secondary cell is in a fully charged condition, the coolant compressor consumes electric energy. Thus, it becomes possible to consume the residual reaction gas remaining in the fuel cell. As a result, it becomes possible to prevent or suppress the cathode electrode from deteriorating.

Preferably, the air-conditioning apparatus includes heat storage means for storing cold or hot thermal energy, and the cold or hot thermal energy obtained when the coolant compressor operates is stored in the heat storage means.

With this arrangement, the cold or hot thermal energy can be stored without loss and accordingly it becomes possible to practically use the residual reaction gas remaining in the fuel cell.

Preferably, the fuel cell includes a plurality of cells or cell groups, and the power generation by the fuel cell is stopped when all of the plurality of cells or cell groups is lower in their voltage level than the power generation stop target voltage.

With this arrangement, it becomes possible to surely prevent or suppress all of the cells or cell groups from deteriorating.

Preferably, the power generation stop target voltage is differentiated according to the position of the key switch.

With this arrangement, when the power generation is temporarily stopped due to continuous deceleration of a traveling vehicle or stopping of the vehicle waiting for a traffic signal, the power generation stop target voltage can be set to a higher value so that the oxygen or the hydrogen can be held as much as possible to realize prompt reactivation. On the other hand, when the power generation is continuously stopped due to turning-off of the key switch, the power generation stop target voltage can be set to a lower value so that the reaction gas can be consumed as much as possible to surely prevent or suppress deterioration of the cells.

Preferably, the fuel cell includes a plurality of cells or cell groups, and a voltage equalizing circuit for equalizing the voltage difference between the plurality of cells or cell groups.

With this arrangement, it becomes possible to consume the reaction gas without causing the voltage difference between the cells or cell groups.

Preferably, electric power storage means is provided for storing electric energy. A generable electric power calculating means is provided for calculating an electric power generable from the electric power storage means. And, the system control means judges with reference to the electric power generable from the electric power storage means as to whether the power generation by the fuel cell is necessary or not.

Preferably, electrically driven accessories relating to the operation of the fuel cell are provided, and the system control means decides that the power generation by the fuel cell is unnecessary when a vehicle requesting electric power is equal to or less than a predetermined electric power and the electric power generable from the electric power storage means is equal to or greater than the vehicle requesting electric power. In this case, the vehicle requesting electric power represents a sum of an electric power consumed by the accessories and an electric power consumed by the electric motor.

Preferably, a first power generation stop target voltage is set when the key switch is in the ON position and the power generation by the fuel cell is judged as being unnecessary. A second power generation stop target voltage is set when the key switch is switched from the ON position to the OFF position. And, the first power generation stop target voltage is higher than the second power generation stop target voltage.

With this arrangement, the first power generation stop target voltage is set to be higher than the second power generation stop target voltage. Accordingly, when the power generation is temporarily stopped, the oxygen or the hydrogen can be held as much as possible to realize prompt reactivation. On the other hand, when the power generation is continuously stopped, the reaction gas can be consumed as much as possible to surely prevent or suppress deterioration of the cells.

BRIEF DESCRIPTION OF THE DRAWINGS

The above and other objects, features and advantages of the present invention will become more apparent from the following detailed description which is to be read in conjunction with the accompanying drawings, in which:

FIG. 5A is a graph showing the characteristics of cell voltage used in the explanation of the first embodiment of the present invention;

FIG. 5B is a graph showing the characteristics of oxygen removing control current in accordance with the first embodiment of the present invention;

FIG. 6 is a circuit diagram showing an essential part of the fuel cell system in accordance with a second embodiment of the present invention;

DESCRIPTION OF THE PREFERRED EMBODIMENTS

Preferred embodiments of the present invention will be explained hereinafter with reference to attached drawings.

First Embodiment

Figure 1:
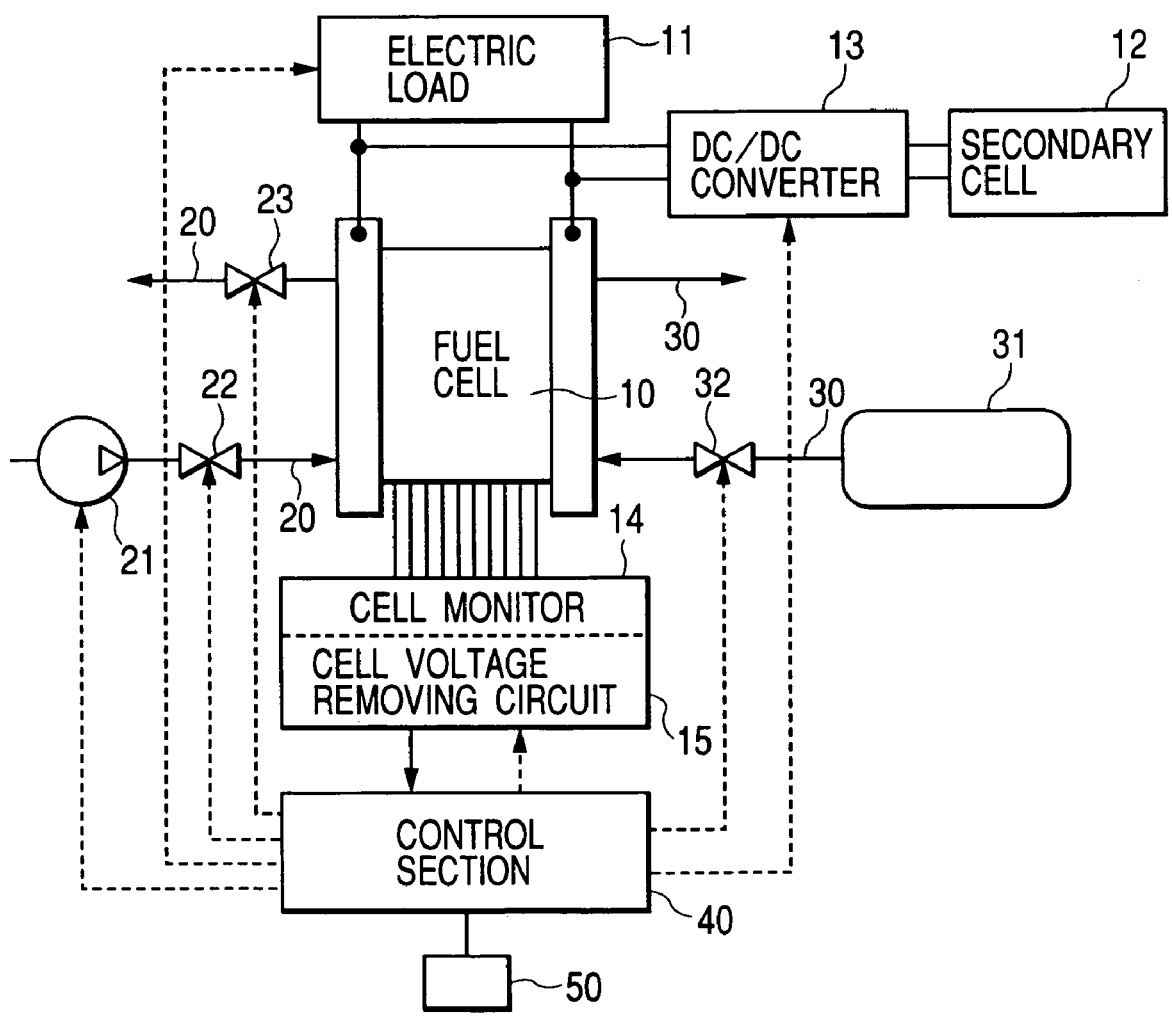
FIG. 1 is a diagram showing an overall arrangement of a fuel cell system in accordance with a first embodiment of the present invention.

FIG. 1 is a diagram showing the overall arrangement of a fuel cell system in accordance with a first embodiment of the present invention. This fuel cell system is, for example, applied to an electric automotive vehicle using a fuel cell serving as power source for traveling.

As shown in FIG. 1, the fuel cell system of this embodiment includes a fuel cell 10 which generates electric power based on electrochemical reaction of hydrogen and oxygen. The fuel cell 10 supplies electric power to an electric load 11, a secondary cell 12 and other electric devices. For example, the electric load 11 of the electric automotive vehicle is an electric motor capable of generating a driving force for traveling of the vehicle. The secondary cell 12 stores electric energy supplied from the fuel cell 10 and also supplies the stored electric energy to various electric loads. The secondary cell 12 corresponds to an electric power storage means of this invention.

According to this embodiment, the fuel cell 10 is a solid high-polymeric electrolyte membrane type fuel cell which includes a plurality of cells, each serving as fundamental unit, which are multilayered or laminated and electrically connected in series. When the hydrogen and the air (oxygen) are fed into the fuel cell 10, the following electrochemical reaction occurs between the hydrogen and the oxygen to generate electric energy.

(Fuel electrode side) $H_2 \rightarrow 2H^+ + 2e^-$ (Air electrode side) $2H^+ + \frac{1}{2}O_2 + 2e^- \rightarrow H_2O$ A DC/DC converter 13 used for voltage conversion interposes between the fuel cell 10 and the secondary cell 12. A cell monitor 14 detects an output voltage of each cell. The output voltage of each cell detected by the cell monitor 14 is sent as a cell voltage signal to a later-described control section 40. The cell monitor 14 corresponds to a voltage measuring means of the present invention.

Figure 2A:
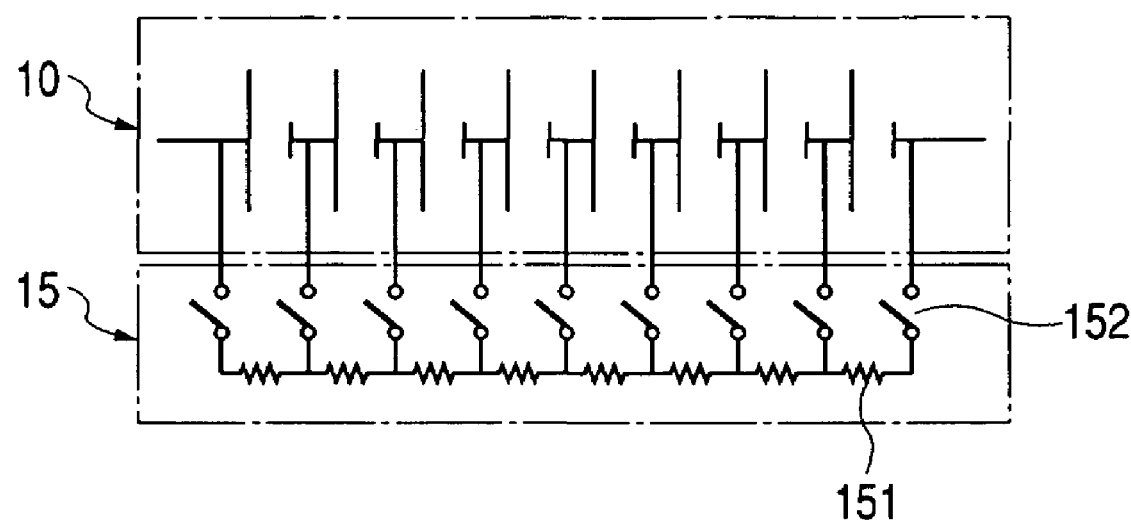
FIGS. 2A and 2B are circuit diagrams each showing an arrangement of a cell voltage removing circuit shown in FIG. 1.
Figure 2B:
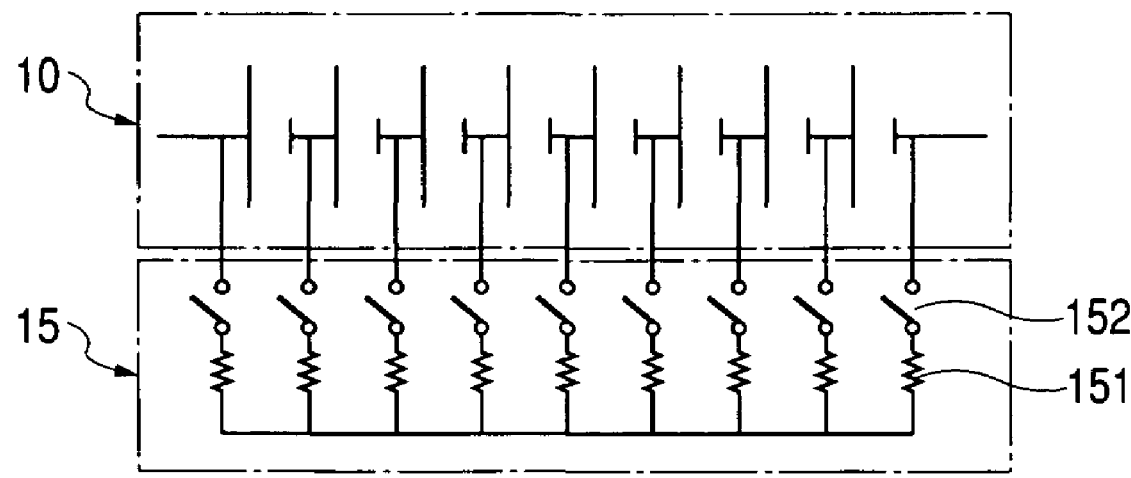

Furthermore, there is a cell voltage removing circuit 15 having an electric resistor connectable to the cells of the fuel cell 10. The cell voltage removing circuit 15, as shown in FIG. 2A or FIG. 2B, includes a plurality of electric resistors 151 and associated switches 152 whose number is identical with a total number of the cells accommodated in the fuel cell 10. The control section 40 controls the operation of each switch 152 so as to selectively connect the electric resistor 151 to a corresponding cell. When a plurality of cells are assembled as one cell group, it is possible to provide the electric resistors 151 and the switches 152 whose number is identical with the total number of cell groups. In this case, the control section 40 controls the operation of each switch 152 so as to selectively connect the electric resistor 151 to a corresponding cell group.

The fuel cell system includes an air flow passage 20 and a fuel flow passage 30. The air (i.e., oxygen) is fed via the air flow passage 20 to an air electrode (i.e., cathode electrode) side of the fuel cell 10. The hydrogen is fed via the fuel flow passage 30 to a fuel electrode (i.e., anode electrode) side of the fuel cell 10. The air flow passage 20 includes a portion provided inside the fuel cell 10 where the air passes. The fuel flow passage 30 includes a portion provided inside the fuel cell 10 where the hydrogen passes. The air corresponds to an oxidizing gas of this invention and the hydrogen corresponds to a fuel gas of this invention.

An electrically driven air pump 21, provided at an upstream end of the air flow passage 20, compresses the intake air and feeds it into the fuel cell 10. A first air valve 22, interposing between the air pump 21 and the fuel cell 10, is capable of closing the air flow passage 20 and is accordingly capable of stopping the feed of air into the fuel cell 10. A second air valve 23, provided at a downstream side of the fuel cell 10, is also capable of closing the air flow passage 20 and is accordingly capable of stopping the feed of air into the fuel cell 10. The air pump 21 corresponds to an oxidizing gas feed means or one of accessories of this invention. Both of the air valves 22 and 23 correspond to a gas feed stopping means of this invention.

A hydrogen bomb 31, which is filled with hydrogen gas, is provided at an upstream end of the fuel flow passage 30. A hydrogen valve 32, interposing between the hydrogen bomb 31 and the fuel cell 10, is capable of closing the fuel flow passage 30 and is accordingly capable of stopping the feed of hydrogen into the fuel cell 10. The hydrogen valve 32 corresponds to the gas feed stopping means of this invention.

The control section (i.e., ECU: Electronic Control Unit) 40 is constituted by a microcomputer incorporating CPU (i.e., Central Processing Unit), ROM (i.e., Read Only Memory), and RAM (i.e., Random Access Memory) and its peripheral circuits. The control section 40 receives the cell voltage signal supplied from the cell monitor 14. Furthermore, the control section 40 performs various computations and outputs control signals to the DC/DC converter 13, the cell voltage removing circuit 15, the air pump 21, the air valves 22 and 23, and the hydrogen valve 32 based on the calculation results.

The control section 40 is connected to a warning device 50 which issues a warning in response to the detection of crossleak. The warning device 50 is practically an indicator lamp, a buzzer, or a character and/or graphic display unit.

Figure 3:
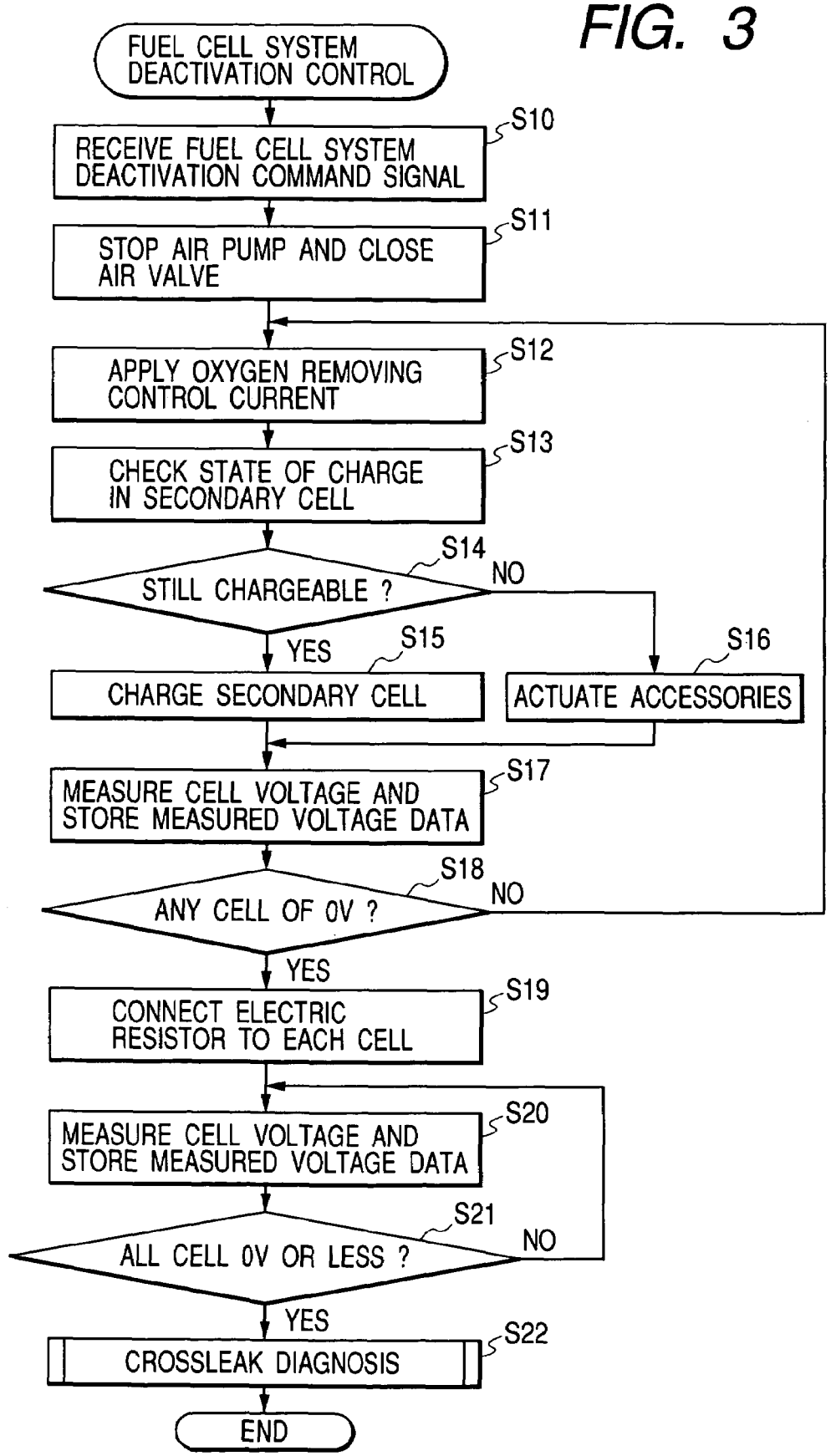
FIG. 3 is a flowchart showing a part of the control procedure of the fuel cell system in accordance with the first embodiment of the present invention.
Figure 4:
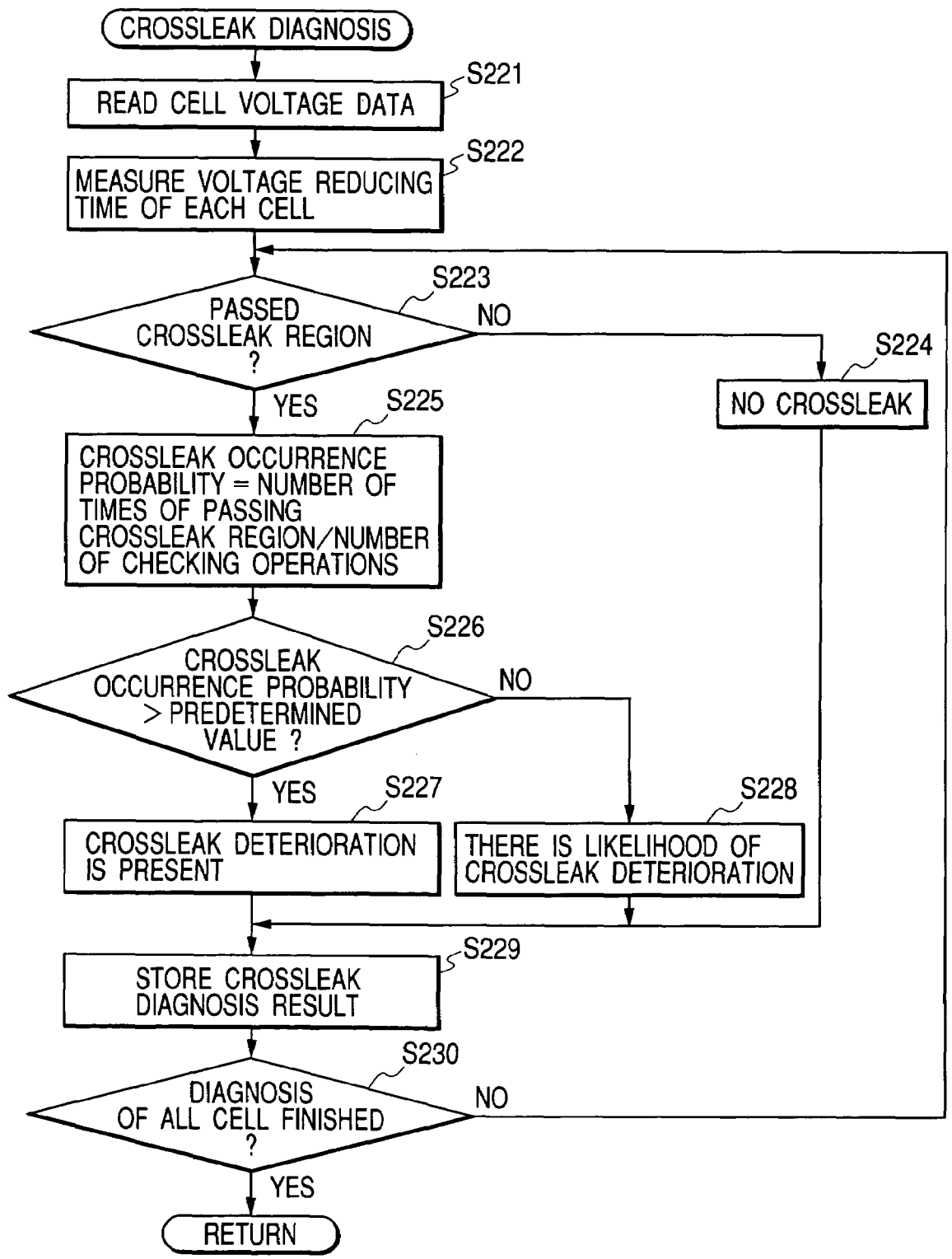
FIG. 4 is a flowchart showing another part of the control procedure of the fuel cell system in accordance with the first embodiment of the present invention.

Next, the operation of the above-described fuel cell system will be explained with reference to FIGS. 1 to 5. FIG. 3 is a flowchart showing a part of the control processing executed in the control section 40, which is residual reaction gas consuming processing for consuming (or removing) the residual reaction gas remaining in the fuel cell 10 when the operation of the fuel cell system is stopped. FIG. 4 is a flowchart showing another part of the control processing executed in the control section 40, which is crossleak diagnosis processing for diagnosing the crossleak of the cells when the operation of the fuel cell system is stopped.

In FIG. 3, when the power generation by the fuel cell 10 is unnecessary (e.g., when the vehicle is stopped or in a regenerative operation mode), the control section 40 receives a fuel cell system deactivation command signal (Step S10). In response to this signal, the control section 40 stops the operation of air pump 21 and controls the air valve 22 and 23 to close the air flow passage 20, thereby stopping the feed of air to the fuel cell 10 (Step S11). In this case, the hydrogen valve 32 is in an opened condition. Thus, the feed of hydrogen into the fuel cell 10 is continuously carried out. Accordingly, the power generation by the fuel cell 10 is feasible as long as the oxygen remains in the fuel cell 10. Thus, after the control section 40 receives the fuel cell system deactivation command signal, the power generation by the fuel cell 10 is continued for a while.

Next, a current (i.e., oxygen removing control current) is applied to the fuel cell 10 to cause the fuel cell 10 to execute power generation and as a result to consume (or remove) the residual oxygen remaining in the fuel cell 10 (Step S12). The oxygen removing control current is set in advance to have a predetermined pattern. According to this embodiment, as shown in FIG. 5B, the oxygen removing control current decreases unilaterally with elapsing time t. The control section 40 controls the operation of the DC/DC converter 13 to adjust the current value to the above predetermined pattern.

Next, the control section 40 checks the state of charge in the secondary cell 12 (Step S13). When the secondary cell 12 is not fully charged (i.e., YES in step S14), the control section 40 controls the DC/DC converter 13 to charge the electric power generated by the fuel cell 10 into the secondary cell 12 (Step S15). When the secondary cell 12 is fully charged (i.e., NO in step S14), the control section 40 actuates the air pump 21 to consume the electric power generated by the fuel cell 10 (Step S16).

With this operation, the residual oxygen remaining in the fuel cell 10 is consumed smoothly and the voltage of the fuel cell 10 decreases gradually. In this case, as shown in FIG. 5A, a significant voltage difference appears among respective cells depending on the amount of residual oxygen in respective cells. If the current is continuously applied even after one cell reaches 0V, the hydrogen residing at the anode electrode shifts by pumping toward the cathode electrode. This is not desirable.

On the other hand, when any one of a plurality of cells reaches 0V, it becomes impossible to generate electric power by all of the cells consisting of the fuel cell 10. In this case, each cell not yet reaching 0V still stores the residual oxygen.

The residual oxygen promotes an oxidizing reaction of carbon contained in the cathode electrode.

Hence, the control section 40 causes the cell monitor 14 to measure the output voltage of each cell and stores the measured voltage data (Step S17). When any one of the plurality of cells reaches 0V (i.e., YES in step S18), the control section 40 terminates the above-described control of power generation carried out by the fuel cell 10 as a whole. Subsequently, the control section 40 causes the cells not yet reaching 0V to continue the power generation to consume the residual oxygen.

More specifically, the control section 40 controls respective switches 152 to connect each electric resistor 151 in the cell voltage removing circuit 15 to a corresponding cell if this cell has not yet reached 0V. Thus, the electric power generated by the cells not yet reaching 0V is discharged (or consumed) by electric resistor 151. In other words, the residual oxygen in the fuel cell 10 can be surely consumed (Step S19). Subsequently, the control section 40 causes the cell monitor 14 to measure the output voltage of each cell and stores the measured voltage data (Step S20). When all of the cells has reached 0V (i.e., YES in Step S21), the control section 40 judges or concludes that the residual oxygen remaining in the fuel cell 10 has been completely consumed. Then, the control section 40 terminates the above-described control of causing the cells not yet reaching 0V to generate electric power.

Next, after all of the cells has reached 0V, the control section 40 diagnoses the presence of crossleak (Step S22). The crossleak diagnosis will be explained in more detail with reference to the flowchart of FIG. 4.

First of all, the control section 40 reads the voltage data of each cell obtained when the power generation is carried out by the fuel cell 10 as a whole to consume the residual oxygen remaining in the fuel cell 10 (Step S221). The control section 40 measures a voltage reducing time of each cell (Step S222).

In the case of crossleak occurring in respective cells, the hydrogen having diffused toward the cathode electrode causes a reaction with the oxygen and accordingly the oxygen is consumed. The reducing speed of the voltage becomes high in the cell which causes the crossleak as a result of consumption of oxygen in this manner.

Hence, the control section 40 assumes that the probability of the crossleak is high in a hatched region of FIG. 5A, i.e., when the time t elapsed after stating the residual reaction gas consuming processing is within a predetermined time t1 and the cell voltage is not greater than a predetermined voltage V1. The control section 40 makes a judgment for each cell as to whether the cell voltage passes this hatched region (i.e., crossleak region) or not (Step S223).

When the cell voltage did not pass the crossleak region (i.e., NO in step S223), the control section 40 judges or concludes that no crossleak has occurred (Step S224).

On the other hand, when the cell voltage passed the crossleak region (i.e., YES in step S223), the control section 40 obtains a crossleak occurrence probability (Step S225). According to this embodiment, the control section 40 obtains the number of times the cell voltage passes the crossleak region during predetermined checking operations. Then, the control section 40 divides the obtained number of times by the number of the predetermined checking operations, thereby obtaining the crossleak occurrence probability.

Then, when the crossleak occurrence probability exceeds a predetermined value (i.e., YES in step S226), the control section 40 judges or concludes that crossleak deterioration is present (Step S227). On the other hand, when the crossleak occurrence probability is equal to or less than the predetermined value (i.e., NO in step S226), the control section 40 judges or concludes that there is likelihood of crossleak deterioration (Step S228).

Next, the control section 40 stores the crossleak diagnosis result (Step S229). The control section 40 continues the above-described crossleak diagnosis until the diagnisis of all the cells is accomplished (i.e., YES in step S230).

According to the above-described embodiment, when the power generation by the fuel cell 10 is unnecessary and the fuel cell system is deactivated, the power generation is carried out under the condition that the feed of air is stopped. Thus, the residual oxygen in the fuel cell 10 can be surely consumed. The electric potential of the cathode electrode promptly decreases. Accordingly, it becomes possible to eliminate adverse influence of the residual oxygen remaining in the fuel cell 10 and prevent or suppress the cathode electrode from deteriorating.

Furthermore, the electric power generated by the fuel cell 10 is stored in the secondary cell 12 in deactivating the fuel cell system. Thus, it becomes possible to effectively use the residual oxygen remaining the fuel cell 10.

Furthermore, in the case the secondary cell 12 is fully charged, the air pump 21 is driven to consume the electric power while the fuel cell 10 generates electric power and consumes the residual oxygen in the fuel cell 10, thereby preventing or suppressing the cathode electrode from deteriorating.

Furthermore, when the power generation is continuously carried out under the condition that one or some cells are not larger than a predetermined voltage, there is the possibility that these low voltage cells may be damaged. However, according to this embodiment, the electric resistors 151 are connected to the high voltage cells when the low voltage cells are present, thereby discharging the electric power generated by the high voltage cells through electric resistors 151. Thus, the residual oxygen is surely consumed so as to prevent or suppress the cathode electrode from deteriorating.

Furthermore, if the crossleak occurs due to deterioration of the electrolyte membrane or the like, the reaction gas will leak via the electrolyte membrane to the opposite electrode. This induces the reduction in the output of the fuel cell and damage in the catalyst. However, according to this embodiment, the diagnosis is carried out every time the power generation by the fuel cell 10 is completed. Thus, it becomes possible to detect the crossleak at an earlier time.

Second Embodiment

Next, a second embodiment of this invention will be explained with reference to FIG. 6.

According to the above-described first embodiment, the cell voltage removing circuit 15 includes a plurality of electric resistors 151. However, as shown in FIG. 6, it is possible to provide only one electric resistor 151 in the cell voltage removing circuit 15. In this case, the electric resistor 151 is switched for a plurality of cells.

Third and Fourth Embodiments

Figure 7:
FIG. 7 is a graph showing the characteristics of oxygen removing control current in accordance with a third embodiment of the present invention.
Figure 8:
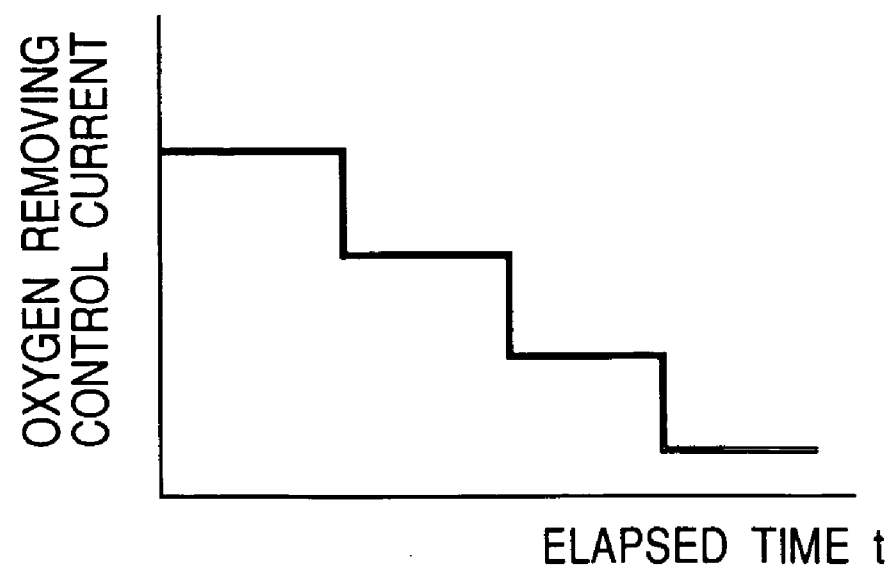
FIG. 8 is a graph showing the characteristics of oxygen removing control current in accordance with a fourth embodiment of the present invention.

According to the above-described first embodiment, the current value of the oxygen removing control current applied to the fuel cell 10 at the time the fuel cell system is deactivated decreases with elapsing time t as shown in FIG. 5B. However, according to a third embodiment shown in FIG. 7, it is possible to set the oxygen removing control current to a constant current value. Alternatively, according to a fourth embodiment shown in FIG. 8, it is possible to set the oxygen removing control current so as to reduce stepwise.

As apparent from the foregoing description, the present invention provides a first fuel cell system including the fuel cell (10) for generating electric power based on electrochemical reaction of an oxidizing gas chiefly containing oxygen and a fuel gas chiefly containing hydrogen, gas feed stopping means (22, 23, 32) for stopping feed of the oxidizing gas or the fuel gas supplied to the fuel cell (10), and electrically driven accessories (21) relating to the operation of the fuel cell (10). According to the above first fuel cell system, at a time power generation by the fuel cell (10) is terminated, electric energy generated by the fuel cell (10) is consumed for a while in the accessories (21) under a condition that feed of at least one of the oxidizing gas and the fuel gas is stopped by the gas feed stopping means (22, 23, 32).

Furthermore, the present invention provides a second fuel cell system which includes the fuel cell (10) consisting of a plurality of cells or cell groups for generating electric power based on electrochemical reaction of an oxidizing gas chiefly containing oxygen and a fuel gas chiefly containing hydrogen, gas feed stopping means (22, 23, 32) for stopping feed of the oxidizing gas or the fuel gas supplied to the fuel cell fuel (10), and electric power storage means (12) for storing electric energy. According to this fuel cell system, at a time power generation by the fuel cell (10) is terminated, power generation by the fuel cell (10) is carried out for a while under a condition that feed of at least one of the oxidizing gas and the fuel gas is stopped by the gas feed stopping means (22, 23, 32). Electric energy generated by the fuel cell (10) is stored in the electric power storage means (12). And, storing the electric energy generated by the fuel cell (10) into the electric power storage means (12) is stopped when at least one cell or cell group of the plurality of cells or cell groups is equal to or less than a predetermined voltage.

According to the first fuel cell system of the present invention, the fuel cell (10) includes a plurality of cells or cell groups, and consuming the electric energy of the fuel cell (10) by the accessories (21) is stopped when at least one cell or cell group of the plurality of cells or cell groups becomes equal to or less than a predetermined voltage.

According to the first or second fuel cell system of the present invention, the fuel cell (10) includes a plurality of cells or cell groups. An electric resistor (151) connectable to the fuel cell (10) is provided independently for each cell or cell group of the fuel cell (10), and the electric resistor (151) consumes the electric energy generated by the fuel cell (10) under a condition that feed of gas is stopped.

Furthermore, one electric resistor (151) is selectively connectable between at least two cells or cell groups of the fuel cell (10). The electric resistor (151) consumes the electric energy generated by the fuel cell (10) under a condition that feed of gas is stopped.

Furthermore, when at least one cell or cell group of the plurality of cells or cell groups is unable to generate electric power, electric energy generated by other cells or cell groups is consumed by the electric resistor (151).

According to the first fuel cell system of the present invention, the fuel cell (10) includes a plurality of cells or cell groups. A voltage measuring means (14) is provided for detecting a voltage of each cell or cell group when power generation is carried out under a condition that feed of gas is stopped. And, a diagnosing means (40) is provided for storing voltage information of each cell or cell group detected by the voltage measuring means (14) and for diagnosing the crossleak of each cell or cell group based on aging phenomenon appearing on the voltage characteristics of each cell or cell group.

Furthermore, the first cell system diagnoses the crossleak of the cell based on the voltage characteristics of each cell or cell group which represents a voltage change relative to a specific current change pattern. Alternatively, the first cell system diagnoses the crossleak of the cell or cell group based on a judgment as to whether or not the voltage of each cell or cell group decreases below a predetermined value within a predetermined time when power generation is carried out under a condition that feed of at least one of the oxidizing gas and the fuel gas is stopped.

Furthermore, based on the result of past diagnoses being carried out predetermined times, the first fuel cell system obtains a probability as to whether or not the voltage of each cell or cell group decreases below the predetermined value within the predetermined time when power generation is carried out under a condition that feed of gas is stopped. Then, the diagnosis of the crossleak of the cell or cell group is carried out based on the obtained probability.

Furthermore, a warning is issued when occurrence of the crossleak is identified.

Fifth Embodiment

Figure 9:
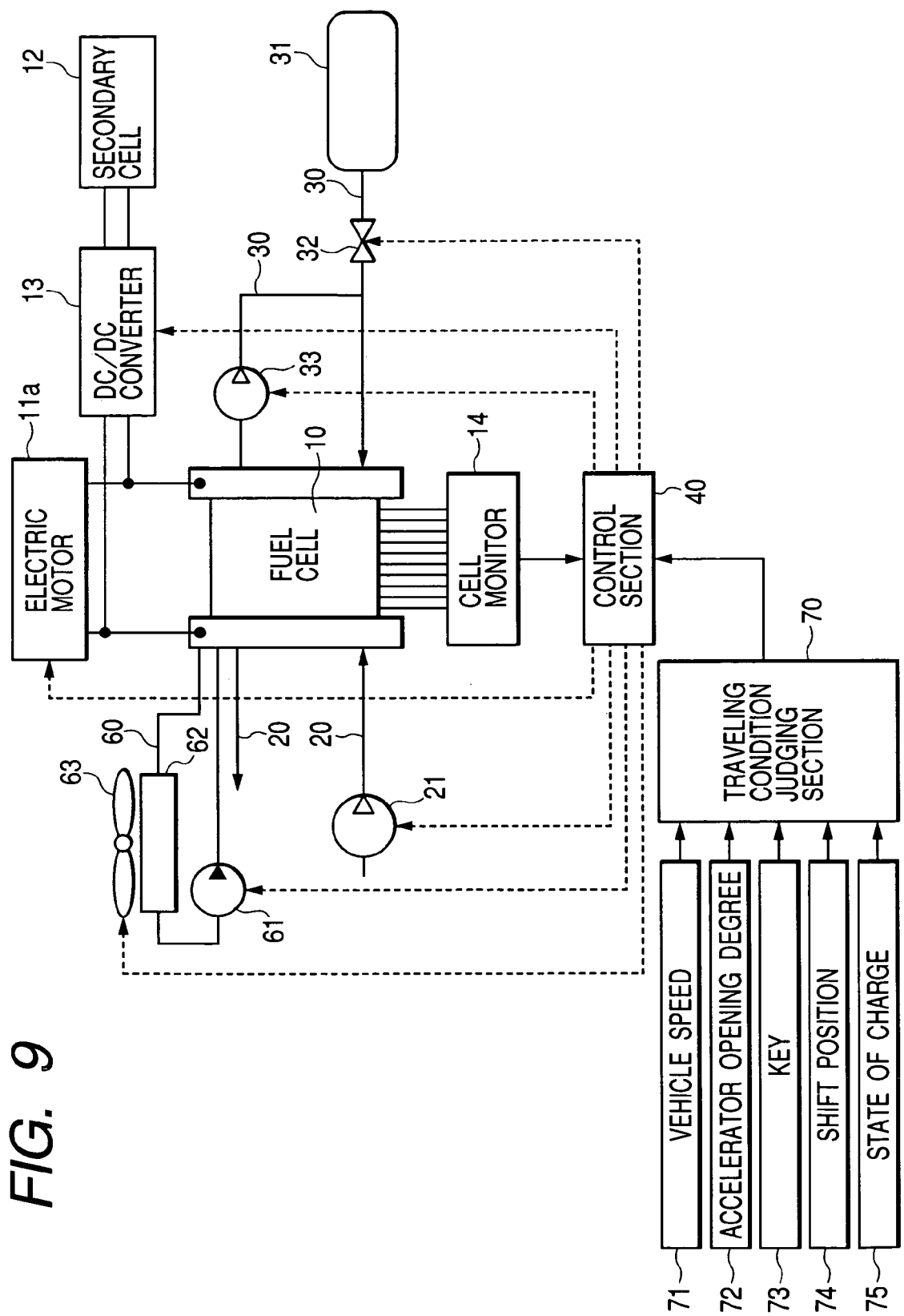
FIG. 9 is a diagram showing an overall arrangement of a fuel cell system in accordance with a fifth embodiment of the present invention.

FIG. 9 is a diagram showing the overall arrangement of a fuel cell system in accordance with a fifth embodiment of the present invention. This fuel cell system is, for example, applied to an electric automotive vehicle using a fuel cell serving as power source for traveling. The portions or components identical with or equivalent to those disclosed in the first embodiment are denoted by the same reference numerals and will not be explained again.

As shown in FIG. 9, the fifth embodiment omits the electric load 11, the cell voltage removing circuit 15, the air valves 22 and 23, and the warning device 50 employed in the first embodiment.

On the other hand, the fifth embodiment includes an electric motor 11a which generates a driving force for traveling of the vehicle. The electric motor 11a operates under a condition that electric power is fed from the fuel cell 10 or from the secondary cell 12.

The fuel flow passage 30 is constituted as a closed loop so that a downstream side of fuel cell 10 is connected to a downstream side of the hydrogen valve 32. With this arrangement, the hydrogen is circulated in the fuel flow passage 30. The hydrogen being not used in the fuel cell 10 is fed again to the fuel cell 10. An electrically driven hydrogen pump 33, provided at a downstream side of the fuel cell 10 in the fuel flow passage 30, circulates the hydrogen in the fuel flow passage 30. The control section 40 controls the rotational speed of the hydrogen pump 33 so that the hydrogen circulation amount and accordingly the hydrogen amount fed into the fuel cell 10 can be controlled appropriately.

The fuel cell system includes a cooling system which controls the temperature of the fuel cell 10 so that the operation temperature of the fuel cell 10 is maintained at a predetermined temperature level (approximately 80° C.) suitable for the electrochemical reaction. The cooling system includes a cooling water path 60 for feeding cooling water (i.e., heating medium) to the fuel cell 10, an electrically driven water pump 61 for circulating cooling water, a radiator 62 for exchanging heat between cooling water and cooling air, and an electrically driven fan 63 for feeding the cooling air to the radiator 62.

A traveling condition judging section 70 judges as to whether the power generation by the fuel cell 10 is necessary or not, and transmits the judgment result to the control section 40. The traveling condition judging section 70 is, for example, constituted by a microcomputer including CPU, ROM, and RAM and its peripheral circuits.

The traveling condition judging section 70 receives a vehicle speed signal sent from a vehicle speed sensor 71 which detects a traveling speed of the vehicle, an accelerator opening degree signal sent from an accelerator sensor 72 which detects a depression amount of an accelerator pedal, a key switch signal representing an operated position of the key switch 73, a shift position signal sent from a shift position sensor 74 which detects a shift position of the transmission, and SOC information sent from a secondary cell managing apparatus 75 which administrates a state of charge (hereinafter, SOC) of the secondary cell 12. The traveling condition judging section 70 judges as to whether the power generation by the fuel cell 10 is necessary or not based on the signals sent from the sensors 71 to 74 and the SOC information sent from the secondary cell managing apparatus 75.

Traveling of the vehicle is allowed when the key switch 73 is in the ON position, and traveling of the vehicle is prohibited when the key switch 73 is in the OFF position. More specifically, when the accelerator pedal is depressed under that condition that the key switch 73 is in the ON position, electric power is supplied to the electric motor 11a and accordingly the electric motor 11a generates a driving force. On the other hand, when the key switch 73 is in the OFF position, electric power is not supplied to the electric motor 11a even if the accelerator pedal is depressed.

The control section 40 and the traveling condition judging section 70 cooperatively function as system control means of this invention. Furthermore, the secondary cell managing apparatus 75 calculates electric power generable by the secondary cell 12 and serves as generable electric power calculating means of this invention.

Figure 10:
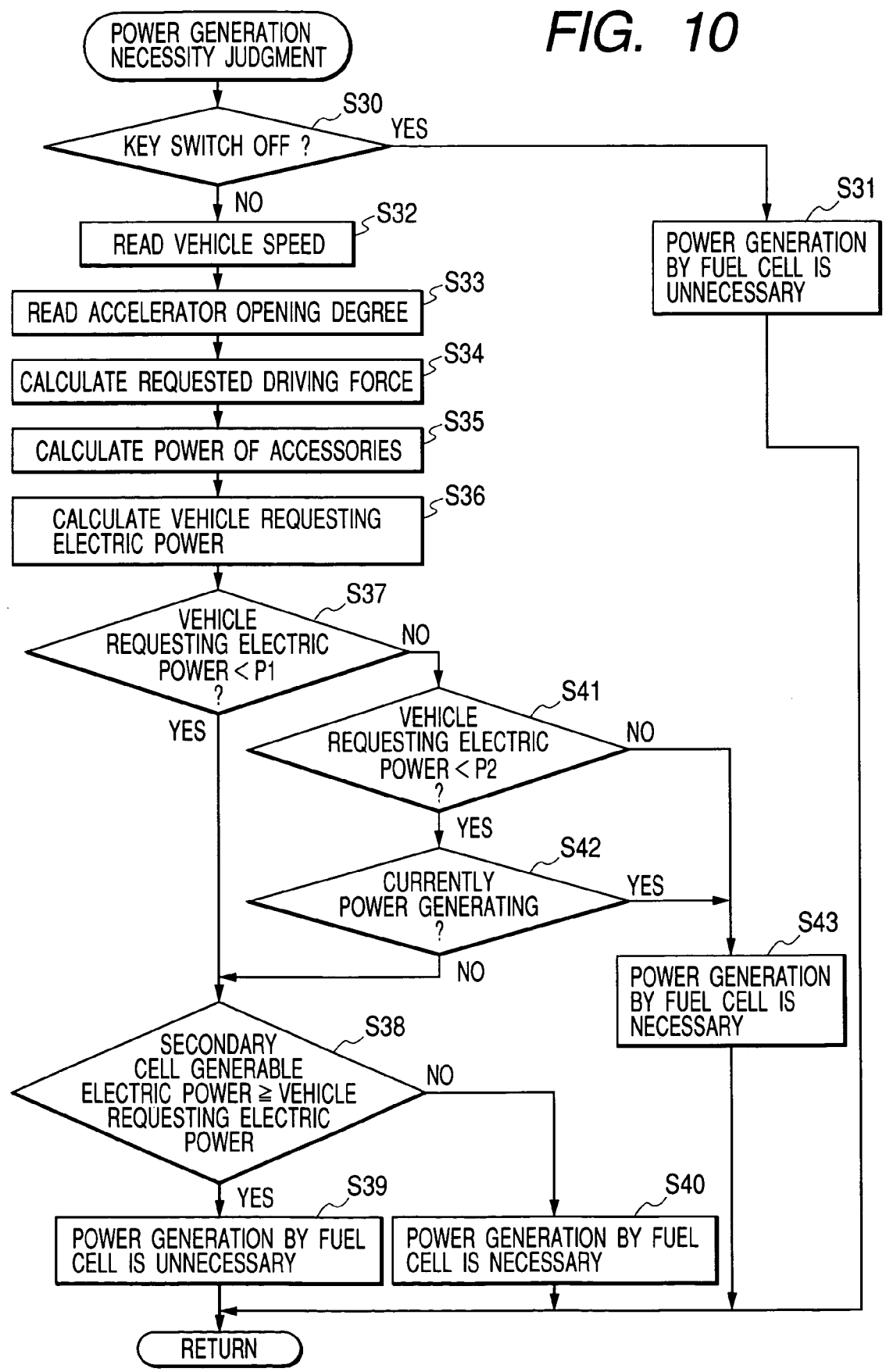
FIG. 10 is a flowchart showing a part of the control procedure of the fuel cell system in accordance with the fifth embodiment of the present invention.
Figure 11:
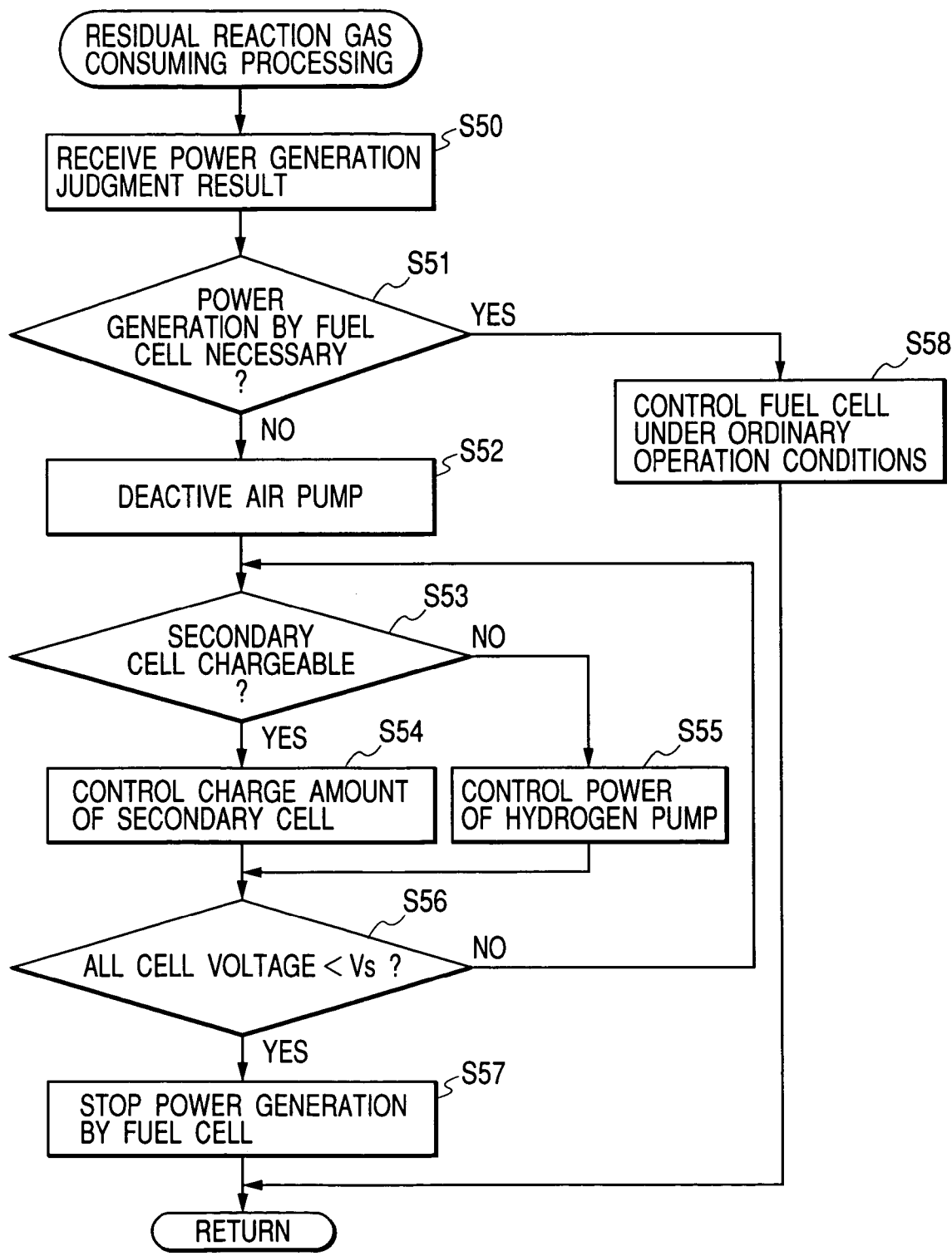
FIG. 11 is a flowchart showing another part of the control procedure of the fuel cell system in accordance with the fifth embodiment of the present invention.

Next, the operation of the above-described fuel cell system will be explained with reference to the flowcharts of FIGS. 10 and 11. FIG. 10 is a flowchart showing a part of the control processing executed in the traveling condition judging section 70, which is processing for judging as to whether or not power generation by the fuel cell 10 is necessary or not. FIG. 11 is a flowchart showing a part of the control processing executed in the control section 40, which is residual reaction gas consuming processing for consuming (or removing) the residual reaction gas remaining in the fuel cell 10 at the time the operation of the fuel cell system is stopped.

In FIG. 10, it is judged as to whether the key switch 73 is in the OFF position or not (step S30). When the key switch 73 is in the OFF position (i.e., YES in step S30), the traveling condition judging section 70 judges or concludes that the power generation by the fuel cell 10 is unnecessary (Step S31). Then, the control flow is returned.

When the key switch 73 is not in the OFF position (i.e., NO in step S30), the traveling condition judging section 70 reads the vehicle speed signal supplied from the vehicle seed sensor 71 (Step S32), and reads the accelerator opening degree signal supplied from the accelerator sensor 72 (Step S33). Then, the traveling condition judging section 70 calculates a driving force requested by a driver based on the vehicle speed signal and the accelerator opening degree signal (Step S34). Next, the traveling condition judging section 70 obtains a power of electrically driven accessories (air pump 21 etc.) relating to the operation of the fuel cell 10 from a map based on the requested driving force calculated in the step S34 (Step S35). Next, the traveling condition judging section 70 calculates a vehicle requesting electric power which is a sum of an electric power fed to the electric motor 11a and an electric power corresponding to the power of accessories (21) calculated in the step S35 (step S36).

When the vehicle requesting electric power calculated in the step S36 is less than a first preset electric power P1 (i.e., YES in step S37), for example when the vehicle is decelerating or stopped to wait for a traffic where the vehicle requesting electric power is small, the traveling condition judging section 70 compares a secondary cell generable electric power (i.e., the generable electric power of the secondary cell 12) with the vehicle requesting electric power (Step S38). Then, when the secondary cell generable electric power is equal to or larger than the vehicle requesting electric power (i.e., YES in step S38), the traveling condition judging section 70 judges or concludes that the power generation by the fuel cell 10 is unnecessary (Step S39). Then, the control flow is returned. On the other hand, when the secondary cell generable electric power is less than the vehicle requesting electric power (i.e., NO in step S38), the traveling condition judging section 70 judges or concludes that the power generation is necessary (Step S40). Then, the control flow is returned.

When the vehicle requesting electric power is equal to or larger than the first preset electric power P1 (i.e., NO in step S37), the traveling condition judging section 70 compares the vehicle requesting electric power with a second preset electric power P2 (Step S41). In this case, the second preset electric power P2 is larger than the first preset electric power P1 (i.e., P1<P2). The second preset electric power P2 is a threshold used in a judgment for restarting the operation of fuel cell 10 from a temporarily stopped condition. Accordingly, when the vehicle requesting electric power is equal to or larger than the second preset electric power P2 (i.e., NO in step S41), the traveling condition judging section 70 judges or concludes that the vehicle requesting load has increased and accordingly restarting of the operation of fuel cell 10 is necessary and hence the power generation by the fuel cell is necessary.

In this manner, the first preset electric power P1 is determined for temporarily stopping the operation of the fuel cell 10 for example in the case the vehicle is decelerating. The second preset electric power P2 is determined for restarting the operation of fuel cell 10 from the temporarily stopped condition. Setting the second preset electric power P2 to be higher than the first preset electric power P1 makes it possible to prevent the fuel cell 10 from hunting between the restarting of operation and the temporarily stopped condition when the vehicle requesting power is in the vicinity of the first preset electric power P1.

On the other hand, when the vehicle requesting electric power is less than the second preset electric power P2 (i.e., YES in step S41), it is assumed that the fuel cell 10 is currently generating electric power or the operation of fuel cell 10 is temporarily stopped but the vehicle requesting electric power does not reach a power level requiring restarting the operation of fuel cell 10. Thus, the traveling condition judging section 70 judges as to whether the fuel cell 10 is currently generating electric power or its operation is temporarily stopped (Step S42).

Then, when the fuel cell 10 is currently generating electric power (i.e., YES in step S42), the traveling condition judging section 70 judges or concludes that the vehicle requesting electric power is sufficiently large and the fuel cell 10 needs to continuously generate electric power (Step S43). Then, the control flow is returned. On the other hand, when the fuel cell 10 is not currently generating electric power (i.e., NO in step S42), the traveling condition judging section 70 judges or concludes that the fuel cell 10 is in the temporarily stopped condition but the vehicle requesting electric power does not reach a power level requiring restarting the operation of fuel cell 10. Thus, the control flow proceeds to the step S38, in which as described above the necessity of power generation by the fuel cell 10 is judged based on the comparison result between the generable electric power of the secondary cell 12 and the vehicle requesting electric power. When the generable electric power of the secondary cell 12 is less than the vehicle requesting electric power, the traveling condition judging section 70 judges or concludes that the fuel cell 10 should be released from the temporarily stopped condition and power generation by the fuel cell 10 should resume.

In FIG. 11, the control section 40 receives a command notifying the necessity of power generation by the fuel cell 10 which is transmitted from the traveling condition judging section 70 (Step S50). Then, when the power generation by fuel cell 10 is required (i.e., YES in step S51), the control section 40 controls the fuel cell 10 to generate electric power under ordinary operating conditions (Step S58).

On the other hand, when the power generation by fuel cell 10 is unnecessary (i.e., NO in step S51), the control section 40 executes the processing of steps S52 to S57 in which the voltage of each cell in the fuel cell 10 is lowered to a level equal to or less than a power generation stop target voltage Vs. In this case, the power generation stop target voltage Vs is a critical voltage at which deterioration of the cell can be prevented.

Namely, the control section 40 first deactivates the air pump 21 to stop the feed of air into the fuel cell 10 (step S52). Next, when the secondary cell 12 is still chargeable (i.e., YES in step S53), the control section 40 controls a charge amount to be charged in the secondary cell 12 (Step S54). The power generation by the fuel cell 10 is continuously carried out to consume the residual oxygen in the fuel cell 10. Furthermore, when the secondary cell 12 is still chargeable (i.e., YES in step S53), the control section controls the output power of the hydrogen pump 33 (Step S55). With this control, the fuel cell 10 continues power generation and consumes the residual oxygen remaining in the fuel cell 10.

The cell voltage decreases in proportion to the amount of the residual oxygen. The power generation by the fuel cell 10 is continued until the cell voltage decreases below the power generation stop target voltage Vs in all cells, namely until the judgment in step S56 becomes YES. After the cell voltage decreases below the power generation stop target voltage Vs in all cells, the control section 40 stops the power generation by the fuel cell 10 (step S57). Through these sequential operations, it becomes possible to reduce the cell voltage to a level equal to or less than the power generation stop target voltage Vs, when the power generation by the fuel cell 10 becomes unnecessary.

According to the above-described fifth embodiment, not only when the key switch 73 is shifted from the ON position to the OFF position but also when power generation by the fuel cell 10 is unnecessary even if the key switch 73 is in the ON position (for example, when the vehicle is decelerating or when the vehicle is stopped to wait for a traffic signal), the residual reaction gas in the fuel cell 10 is consumed until the cell voltage decreases below the power generation stop target voltage Vs. Hence, it becomes possible to surely prevent or suppress the cathode electrode from deteriorating.

Regarding the step S55 of FIG. 11, the hydrogen pump 33 can be replaced with the water pump 61 or the fan 63 of the radiator 62. In this case, the power of the water pump 61 or the radiator fan 63 is controlled to consume the residual oxygen in the fuel cell 10 while the fuel cell 10 continues power generation.

Sixth Embodiment

Figure 12:
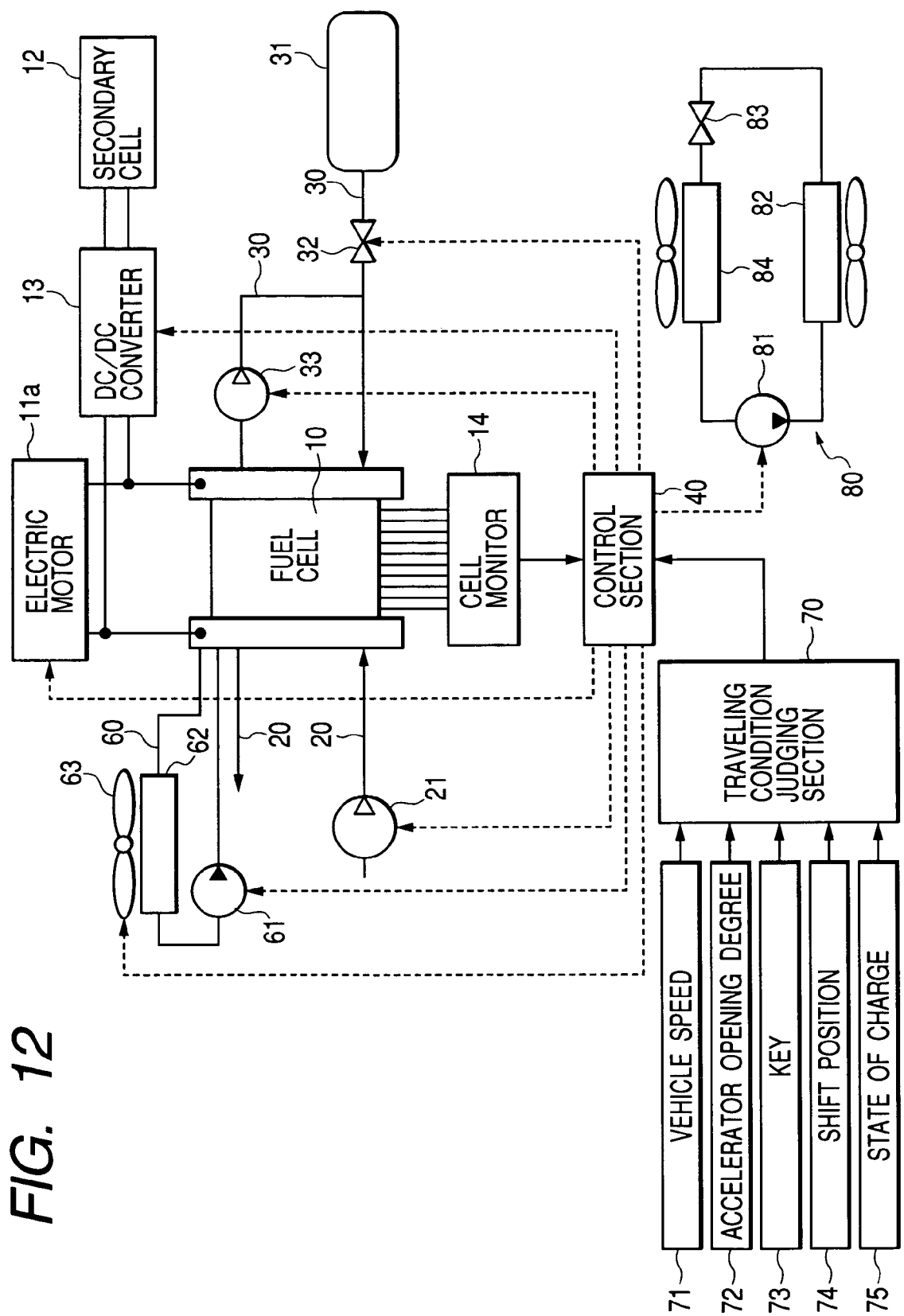
FIG. 12 is a diagram showing an overall arrangement of a fuel cell system in accordance with a sixth embodiment of the present invention.

FIG. 12 is a diagram showing the overall arrangement of a fuel cell system in accordance with a sixth embodiment of the present invention. This fuel cell system is, for example, applied to an electric automotive vehicle equipped with air-conditioning apparatus. The portions or components identical with or equivalent to those disclosed in the fifth embodiment are denoted by the same reference numerals and will not be explained again.

In FIG. 12, an air-conditioning apparatus 80 for air-conditioning a passenger compartment of the vehicle includes a coolant compressor 81, a condenser 82, an expansion valve 83, and an evaporator 84. The coolant compressor 81, having the function of compressing the coolant gas and discharging the compressed coolant gas, is an electric coolant compressor driven by an electric motor (not shown).

In the fifth embodiment, the power of the hydrogen pump 33 is controlled in the step S55 of FIG. 11. However, according to this embodiment, the power of the coolant compressor 81 is controlled in the step S55 of FIG. 11. With this control, the fuel cell 10 continues power generation so that the residual oxygen in the fuel cell 10 is consumed sufficiently.

It is possible that the evaporator 84 is equipped with a cold heat accumulating member capable of storing cold thermal energy while the condenser is equipped with a hot heat accumulating member capable of storing hot thermal energy. With this arrangement, it becomes possible to store the cold or hot thermal energy in the cold or hot heat accumulating member when the coolant compressor 81 operates. The electric power consumed during the processing of step S55 of FIG. 11 can be used effectively. Accordingly, the residual reaction gas in the fuel cell 10 can be utilized without loss.

Seventh Embodiment

Figure 13:
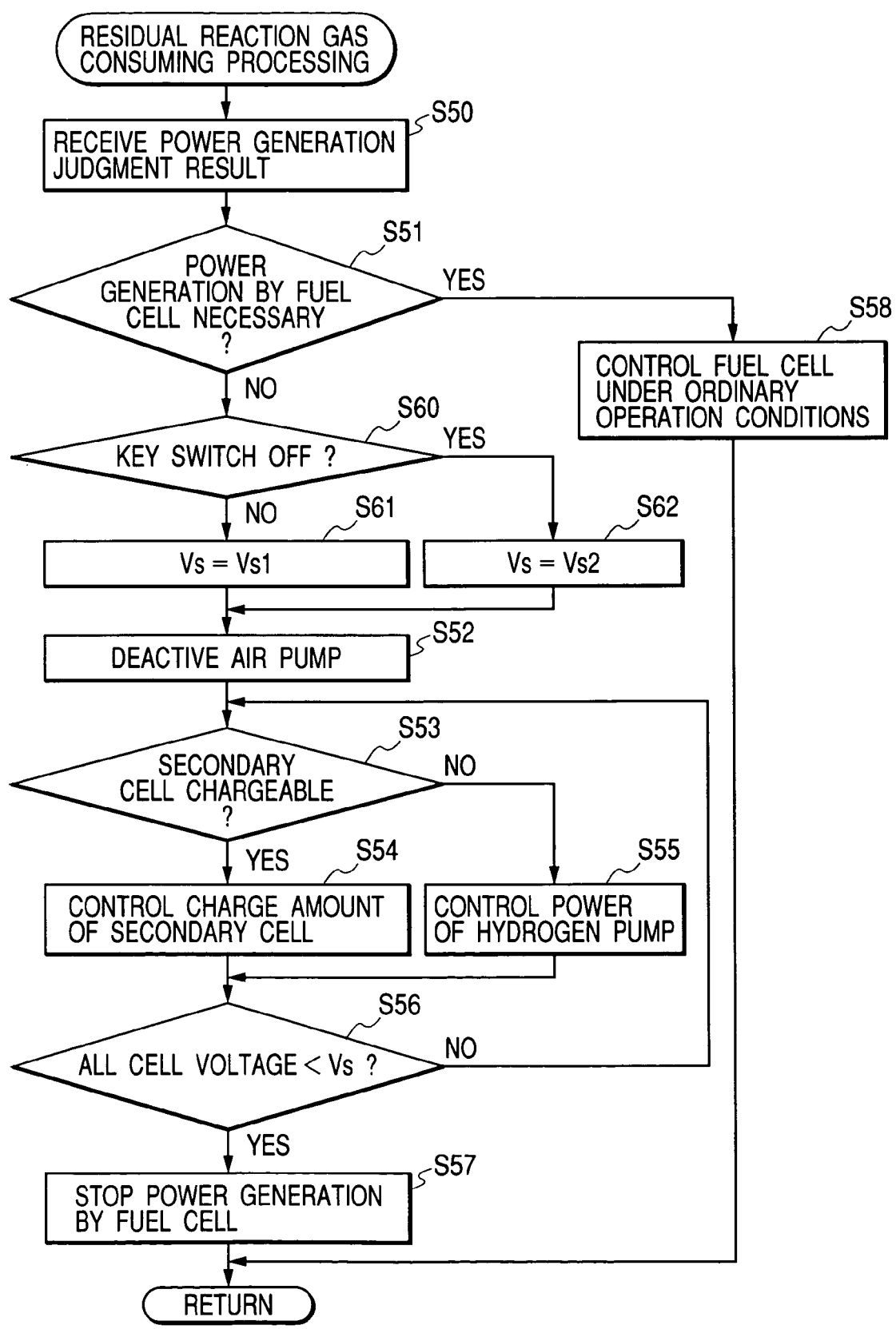
FIG. 13 is a flowchart showing a part of the control procedure of the fuel cell system in accordance with a seventh embodiment of the present invention.

FIG. 13 is a flowchart showing a part of the residual reaction gas consuming processing for consuming (or removing) the residual reaction gas in the fuel cell 10 when the operation of the fuel cell system is stopped in accordance with a seventh embodiment of this invention. The portions or components identical with or equivalent to those disclosed in the fifth embodiment are denoted by the same reference numerals and will not be explained again.

This embodiment is characterized in that the power generation stop target voltage Vs is variable depending on a judgment as to whether the power generation is unnecessary temporarily or for a long time. For example, when the vehicle is decelerating or stopped to wait for a traffic signal, the power generation by the fuel cell 10 is unnecessary temporarily. On the other hand, when the key switch 73 is once tuned off, the power generation by the fuel cell 10 will be unnecessary for a relatively long time. To this end, as shown in FIG. 13, this embodiment adds the control processing of steps S60 to S62 between the steps S51 and S52 of the fifth embodiment.

More specifically, when the key switch 73 is in the ON condition and the power generation is unnecessary (i.e., NO in step S60), the control section 40 adjusts the power generation stop target voltage Vs to a first power generation stop target voltage Vs1 (Step S61). When the key switch 73 is switched to the OFF position and the power generation becomes unnecessary (i.e., YES in step S60), the control section 40 adjusts the power generation stop target voltage Vs to a second power generation stop target voltage Vs2 (Step S62). In this case, the first power generation stop target voltage Vs1 is larger than the second power generation stop target voltage Vs2, i.e., Vs1>Vs2.

It is preferable that the first power generation stop target voltage Vs1 is set to be close to the highest value in the voltage range at which the deterioration of the cell can be prevented. In the case of temporary stopping of the power generation, it is preferable to keep the oxygen or the hydrogen as much as possible so that the power generation by the fuel can be smoothly and promptly restarted.

On the contrary, in the case of long-lasting stopping of the power generation, it is preferable to consume the hydrogen (or the oxygen) as much as possible. This is the reason why the second power generation stop target voltage Vs2 is set to be lower than the first power generation stop target voltage Vs1. Completely consuming the residual hydrogen in the fuel cell when the key switch is turned off is advantageous in the aspect of the safety severely required in this kind of automotive vehicles.

Eighth Embodiment

Next, an eighth embodiment of this invention will be explained with reference to FIG. 14. In controlling the consumption amount of the hydrogen or the oxygen in accordance with the control of power generation amount in the fuel cell 10, the voltage in each cell may be differentiated largely depending on a cell structure. In such a case, it is preferable to provide a voltage equalizing circuit connected to the fuel cell for eliminating the voltage difference among the cells or cell groups. With the provision of the voltage equalizing circuit, it becomes possible to realize uniform consumption of the hydrogen or the oxygen in respective cells or cell groups.

Figure 14:
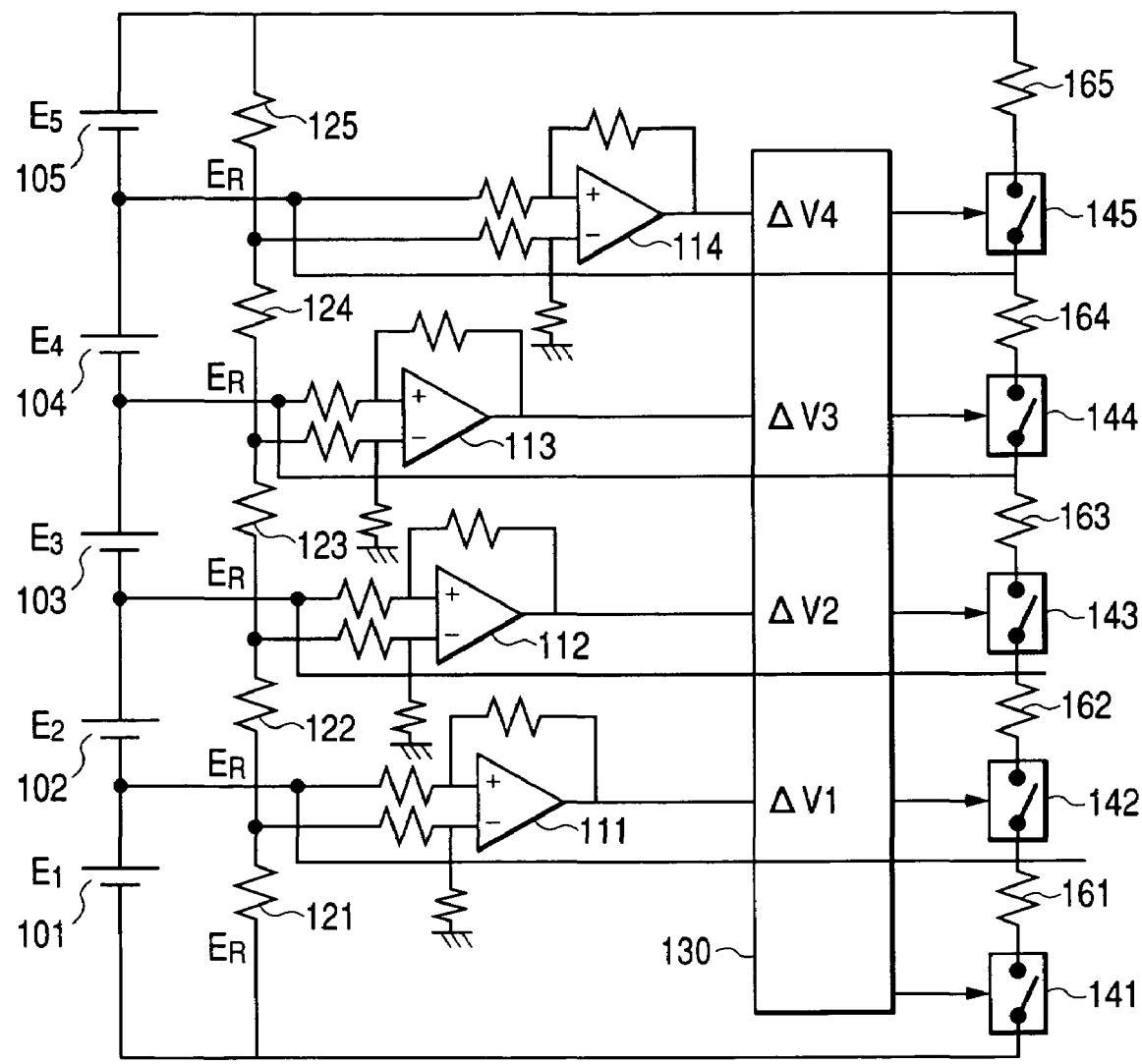
FIG. 14 is a voltage equalizing circuit employed in a fuel cell system in accordance with an eighth embodiment of the present invention.

FIG. 14 shows a voltage equalizing circuit for the fuel cell including a total of five cells 101 to 105. An output voltage E1 of a first cell 101 is entered into a non-inverting input terminal of a first differential amplifier 111. An average voltage ER of the five cells 101 to 105 being serially connected is entered into an inverting input terminal of the first differential amplifier 111. Hence, the first differential amplifier 111 outputs an electric potential difference $\Delta V1$ representing the difference between the output voltage E1 and the average voltage ER. In this case, the average voltage ER is obtained by dividing the sum of output voltages E1 to E5 of respective cells 101 to 105 by five resistors 121 to 125 each having the same resistance value. Thus, the average voltage ER is expressed by the equation ER=(E1+E2+E3+E4+E5)/5.

In the same manner, output voltages E2 to E4 are entered into non-inverting input terminals of second to fourth differential amplifiers 112 to 114 and the average voltage ER is entered into the inverting input terminals of second to fourth differential amplifiers 112 to 114. The second to fourth differential amplifiers 112 to 114 output electric potential differences $\Delta V2$ to $\Delta V4$ representing the difference between respective output voltages E2 to E4 and the average voltage ER.

A control circuit 130, as described in detail hereinafter, controls first to fifth switch 141 to 145 based on the electric potential differences $\Delta V1$ to $\Delta V4$ to adjust the current flowing across the first to fifth discharge resistors 161 to 165.

First of all, the voltage control of first cell 101 will be explained. If $\Delta V1>0$, the relationship E1>ER is established. If $\Delta V1 \leq 0$, the relationship E1$\leq$ER is established. When E1>ER, the output voltage E1 of the first cell 101 is higher than the average voltage ER. Accordingly, the control circuit 130 closes the first switch 141 to discharge the first cell 101 via the first discharge resistor 161 so as to eliminate the voltage difference.

Next, in the case of the secondary cell 102, if $\Delta V2+\Delta V1>0$, the output voltage E2 of the secondary cell 102 is higher than the average voltage ER. Accordingly, the control circuit 130 closes the second switch 142 to discharge the secondary cell 102 via the second discharge resistor 162 so as to eliminate the voltage difference.

Similarly, in the case of the third cell 103, if $\Delta V3+\Delta V2>0$, the control circuit 130 closes the third switch 143 to discharge the third cell 103 via the third discharge resistor 163. In the case of the fourth cell 104, if $\Delta V4+\Delta V3>0$, the control circuit 130 closes the fourth switch 144 to discharge the fourth cell 104 via the fourth discharge resistor 164.

Furthermore, the voltage control of fifth cell 105 will be explained. If $\Delta V4<0$, the relationship E5>ER is established. If $\Delta V4 \geq 0$, the relationship E5$\leq$ER is established. When E5>ER, the output voltage E5 of the fifth cell 105 is higher than the average voltage ER. Accordingly, the control circuit 130 closes the fifth switch 145 to discharge the fifth cell 105 via the fifth discharge resistor 165 so as to eliminate the voltage difference.

According to this embodiment, the cell having an output voltage level higher than the average voltage can be decreased by discharge. Thus, it becomes possible to realize uniform consumption of the hydrogen or the oxygen in respective cells without causing the voltage difference between the cells.

Ninth Embodiment

Next, a ninth embodiment of this invention will be explained with reference to the flowchart of FIG. 15. According to the fifth embodiment, the feed of air is stopped when the residual reaction gas in the fuel cell 10 is consumed (or removed). However, according to this embodiment, the feed of hydrogen is stopped. To this end, this embodiment modifies the steps S52 and S55 in the fifth embodiment. The rest of this embodiment is identical with that of the fifth embodiment.

Figure 15:
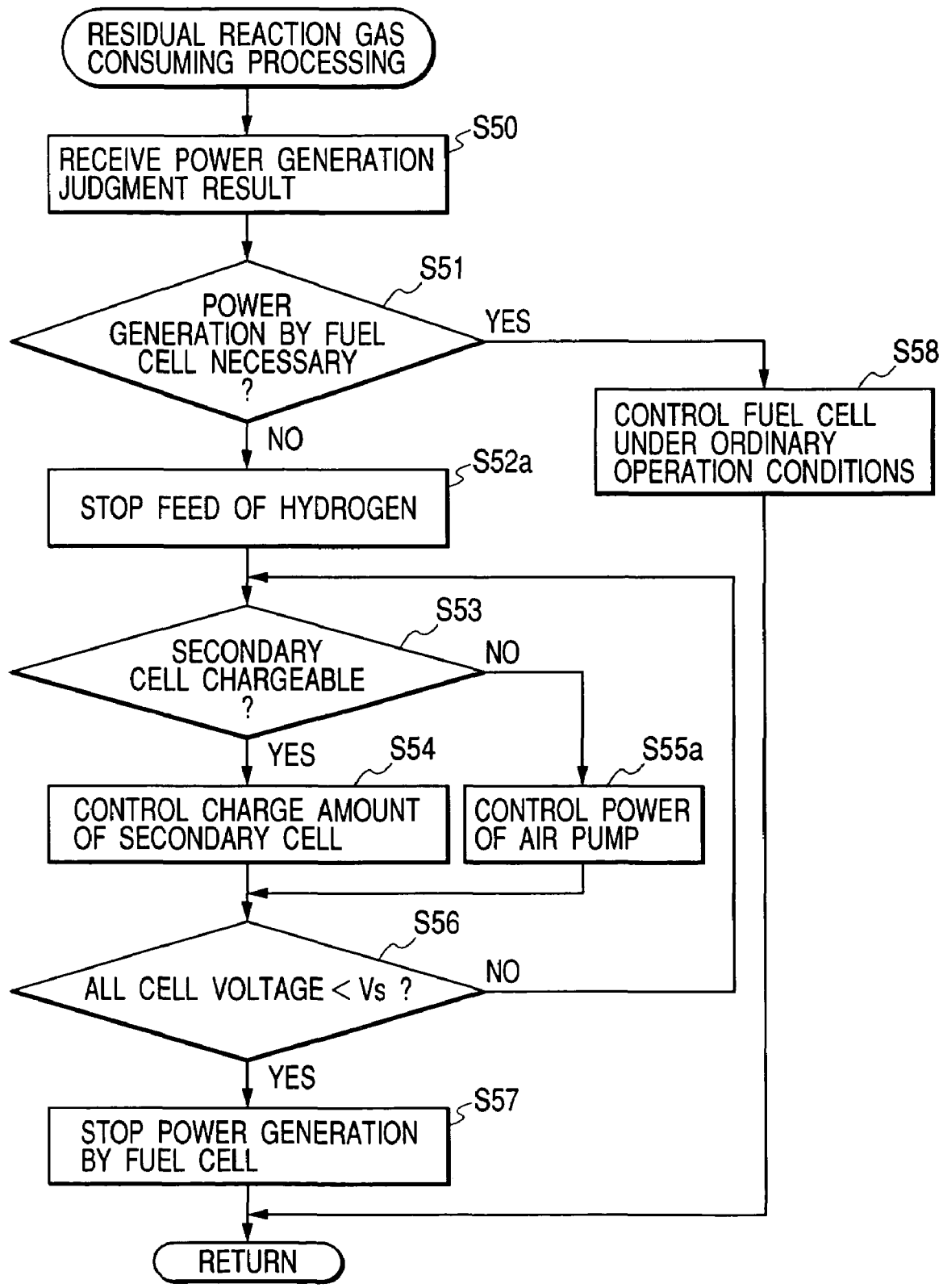
FIG. 15 is a flowchart showing a part of the control procedure of the fuel cell system in accordance with a ninth embodiment of the present invention.

In FIG. 15, when the power generation by the fuel cell 10 is unnecessary (i.e., NO in step S51), the control section 40 causes the hydrogen valve 32 to close the fuel flow passage 30 and accordingly to stop the feed of hydrogen into the fuel cell 10 (Step S52a). Next, when the secondary cell 12 is not chargeable (NO in step S53), the control section 40 controls the output power of the air pump 21 (Step S55a). With this operation, the fuel cell 10 continues power generation to consume the residual hydrogen in the fuel cell 10.

According to the above-described ninth embodiment, like the fifth embodiment, it becomes possible to surely prevent or suppress the cathode electrode from deteriorating.

Tenth Embodiment

Figure 16:
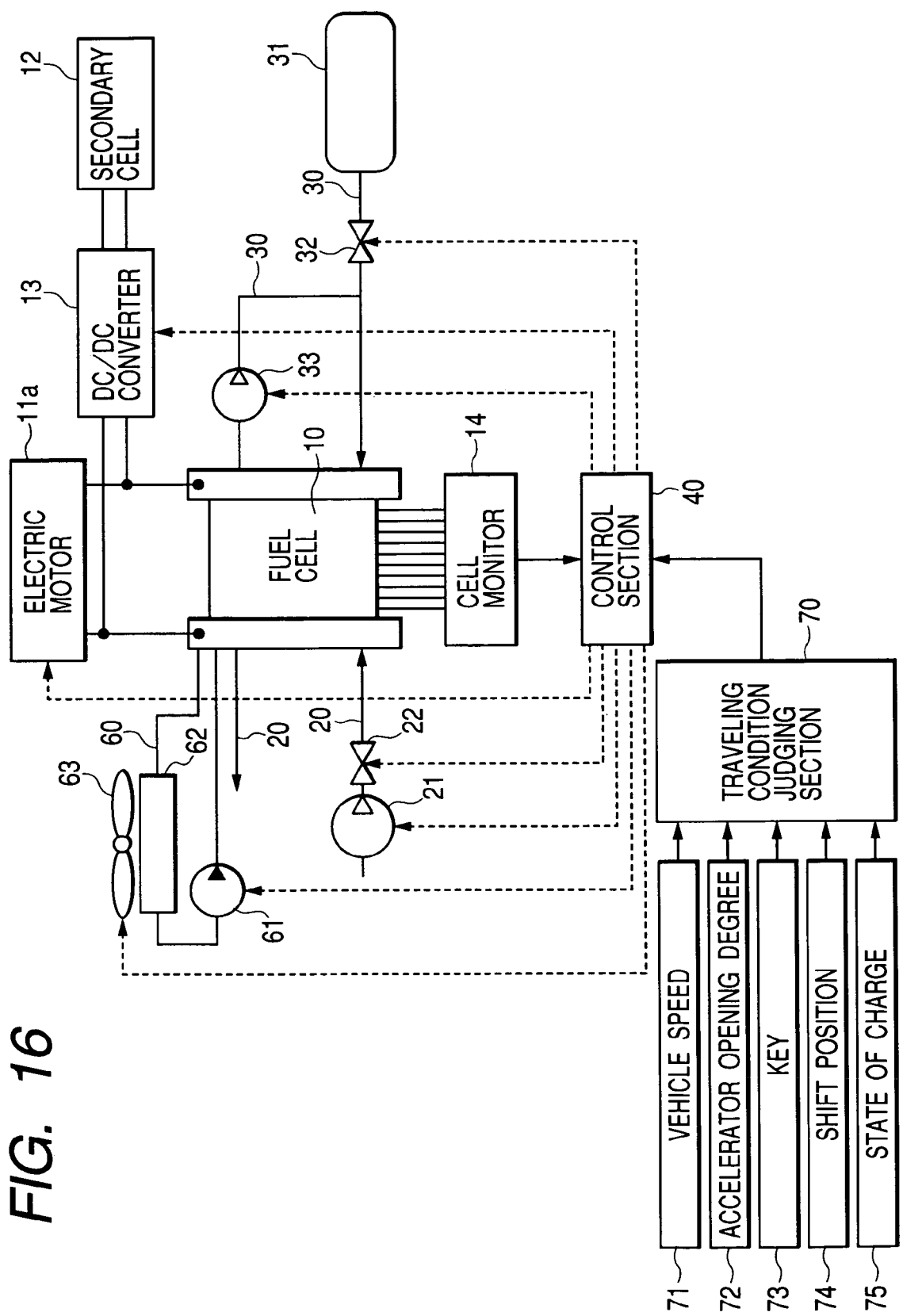
FIG. 16 is a diagram showing an overall arrangement of a fuel cell system in accordance with a tenth embodiment of the present invention.

Next, a tenth embodiment of this invention will be explained with reference to FIG. 16. According to the fifth embodiment, the air pump 21 is deactivated to stop the feed of air. However, it is possible to provide the first air valve 22 as shown in FIG. 16. According to the tenth embodiment, the feed of air into the fuel cell 10 is stopped when the air flow passage 20 is closed by the first air valve 22.

As apparent from the foregoing description, the present invention provides a third fuel cell system installable in an automotive vehicle which includes a fuel cell (10) for generating electric power based on electrochemical reaction of an oxidizing gas chiefly containing oxygen and a fuel gas chiefly containing hydrogen, and an electric motor (11a) receiving the electric power generated by the fuel cell (10) for generating a driving force of a traveling vehicle, in which traveling of the vehicle is allowed when a key switch (73) of the vehicle is in an ON position, and traveling of the vehicle is prohibited when the key switch (73) is in an OFF position.

The third fuel cell system of the present invention includes gas feed stopping means (21, 32, 33) and system control means (40, 70). The gas feed stopping means (21, 32, 33) stops feed of the oxidizing gas or the fuel gas to the fuel cell (10). The system control means (40, 70) judges as to whether the power generation of the fuel cell (10) is required or not based on the position of the key switch (73) and the traveling condition of the vehicle, and controls the operation of the gas feed stopping means (21, 32, 33) as well as the power generation by the fuel cell (10).

The system control means (40, 70) causes the fuel cell (10) to generate electric power until the voltage of the fuel cell (10) becomes equal to or less than a power generation stop target voltage (Vs) under a condition that feed of at least one of the oxidizing gas and the fuel gas is stopped by the gas feed stopping means (22, 23, 32), when the key switch (73) is switched from the ON position to the OFF position, and when the key switch (73) is in the ON position and the power generation by the fuel cell (10) is judged as being unnecessary.

The third fuel cell system of the present invention includes electric power storage means (12) for storing electric energy is provided, and the electric energy generated by the fuel cell (10) is stored in the electric power storage means (12) under a condition that feed of the gas is stopped.

The electrically driven accessories (21) relating to the operation of the fuel cell (10) are provided in the automotive vehicle, and the electric energy generated by the fuel cell (10) is consumed by the accessories (21) under a condition that feed of the gas is stopped.

The air-conditioning apparatus (80) for air-conditioning a compartment of the vehicle is installed in the vehicle. The air-conditioning apparatus (80) includes an electrically driven coolant compressor (81) for compressing and discharging the coolant. And, the electric energy generated by the fuel cell (10) is consumed by the coolant compressor (81) under a condition that feed of the gas is stopped.

The air-conditioning apparatus (80) includes heat storage means for storing cold or hot thermal energy, and the cold or hot thermal energy obtained when the coolant compressor (81) operates is stored in the heat storage means.

The fuel cell (10) includes a plurality of cells or cell groups, and the power generation by the fuel cell (10) is stopped when all of the plurality of cells or cell groups is lower in their voltage level than the power generation stop target voltage (Vs).

The power generation stop target voltage (Vs) is differentiated according to the position of the key switch (73).

The voltage equalizing circuit (111~114, 121~125, 130, 141~145, 161~165) is provided for equalizing the voltage difference between the plurality of cells or cell groups.

The electric power storage means (12) is provided for storing electric energy. A generable electric power calculating means (75) is provided for calculating an electric power generable from the electric power storage means (12). And, the system control means (40, 70) judges with reference to the electric power generable from the electric power storage means as to whether the power generation by the fuel cell (10) is necessary or not.

The electrically driven accessories (21) relating to the operation of the fuel cell (10) are provided in the vehicle, and the system control means (40, 70) decides that the power generation by the fuel cell (10) is unnecessary when a vehicle requesting electric power is equal to or less than a predetermined electric power and the electric power generable from the electric power storage means is equal to or greater than the vehicle requesting electric power. In this case, the vehicle requesting electric power represents a sum of an electric power consumed by the accessories (21) and an electric power consumed by the electric motor (11a).

The first power generation stop target voltage (Vs1) is set when the key switch (73) is in the ON position and the power generation by the fuel cell (10) is judged as being unnecessary. The second power generation stop target voltage (Vs2) is set when the key switch (73) is switched from the ON position to the OFF position. And, the first power generation stop target voltage (Vs1) is higher than the second power generation stop target voltage (Vs2).

Other Embodiment

According to the above-described embodiment, when the fuel cell system deactivation command signal is received (i.e., step S10 in FIG. 3), the feed of air into the fuel cell 10 is stopped (i.e., step S11). However, instead of stopping the feed of air, it is possible to stop the feed of hydrogen into the fuel cell 10.

More specifically, the control section 40 causes the hydrogen valve 32 to close the fuel flow passage 30 to stop the feed of hydrogen into the fuel cell 10. Meanwhile, the control section 40 drives the air pump 21 under the condition that the air valves 22 and 23 are opened so as to continuously feed the air into the fuel cell 10. Then, like the first embodiment, the control section 40 causes the fuel cell 10 to generate electric power and accordingly consume (remove) the residual hydrogen in the fuel cell 10. Thus, it becomes possible to obtain the effects similar to those of the first embodiment.

Furthermore, in the above-described embodiment, when it is judged that the crossleak deterioration is present (i.e., step S227 of FIG. 4), it is preferable to memorize the cells being subjected to the crossleak deterioration. It is also preferable to issue a warning for informing the presence of the cell in which the crossleak deterioration has occurred.

Furthermore, according to the above-described embodiment, the electric power generated by the fuel cell 10 is stored in the secondary cell 12 at the time the operation of the fuel cell system is stopped. However, it is possible to replace the secondary cell 12 with a capacitor capable of serving as the electric power storage means. In this case, the electric power generated by the fuel cell 10 is stored in this capacitor at the time the operation of the fuel cell system is stopped.

What is claimed is:

1. A fuel cell system comprising:
   a fuel cell for generating electric power based on electrochemical reaction of an oxidizing gas chiefly containing oxygen and a fuel gas chiefly containing hydrogen;
   gas feed stopping means for stopping feed of said oxidizing gas or said fuel gas supplied to said fuel cell;
   electric power storage means for storing the electric power generated by said fuel cell; and
   an electrically driven accessory, wherein
   during a deactivation of said fuel cell system;
   power generation by said fuel cell is carried out under a condition that feed of at least one of said oxidizing gas and said fuel gas is stopped by said gas feed stopping means;
   the electric power generated by said fuel cell is stored into said electric power storage means when said electric power storage means is not fully charged; and
   the electric power generated by said fuel cell is consumed by said accessory when said electric power storage means is fully charged.

2. The fuel cell system according to claim 1, wherein
said fuel cell includes a plurality of cells or cell groups, and
consuming the electric power by said accessory is stopped when at least one cell or cell group of said plurality of cells or cell groups becomes equal to or less than a predetermined voltage.

3. The fuel cell system in accordance with claim 1, wherein
said fuel cell includes a plurality of cells or cell groups,
an electric resistor connectable to said fuel cell is provided independently for each cell or cell group of said fuel cell, and
said electric resistor consumes the electric energy generated by said fuel cell under a condition that feed of gas is stopped.

4. The fuel cell system in accordance with claim 1, wherein
said fuel cell includes a plurality of cells or cell groups,
an electric resistor connectable to said fuel cell is provided, wherein said electric resistor includes one electric resistor being selectively connectable between at least two cells or cell groups of said fuel cell, and
said electric resistor consumes the electric energy generated by said fuel cell under a condition that feed of gas is stopped.

5. The fuel cell system in accordance with claim 1, wherein
said fuel cell includes a plurality of cells or cell groups,
an electric resistor connectable to said fuel cell is provided, and
when at least one cell or cell group of said plurality of cells or cell groups is unable to generate electric power, electric energy generated by other cells or cell groups is consumed by said electric resistor.

6. The fuel cell system in accordance with claim 1, wherein
said fuel cell includes a plurality of cells or cell groups,
voltage measuring means is provided for detecting a voltage of each cell or cell group when power generation is carried out under a condition that feed of gas is stopped, and
diagnosing means is provided for storing voltage information of each cell or cell group detected by said voltage measuring means and for diagnosing an occurrence of a crossleak in said each cell or cell group based on aging phenomenon appearing on the voltage characteristics of each cell or cell group.

7. The fuel cell system in accordance with claim 6, wherein said voltage characteristics of each cell or cell group is a voltage change relative to a specific current change pattern.

8. The fuel cell system in accordance with claim 6, wherein said diagnosing means diagnoses the occurrence of the crossleak in said cell or cell group based on a judgment as to whether or not the voltage of each cell or cell group decreases below a predetermined value within a predetermined time when power generation is carried out under a condition that feed of at least one of said oxidizing gas and said fuel gas is stopped.

9. The fuel cell system in accordance with claim 8, wherein said diagnosing means obtains a probability based on a result of past diagnoses being carried out predetermined times as to whether or not the voltage of each cell or cell group decreases below the predetermined value within the predetermined time when power generation is carried out under a condition that feed of gas is stopped, and said diagnosing means diagnoses the occurrence of the crossleak in said cell or cell group based on the obtained probability.

10. The fuel cell system in accordance with claim 7, wherein a warning is issued when the occurrence of the crossleak is identified.

11. A fuel cell system comprising:
a fuel cell including a plurality of cells or cell groups for generating electric power based on electrochemical reaction of an oxidizing gas chiefly containing oxygen and a fuel gas chiefly containing hydrogen;
gas feed stopping means for stopping feed of said oxidizing gas or said fuel gas supplied to said fuel cell;
electric power storage means for storing the electric power generated by said fuel cell; and
an electrically driven accessory, wherein
during a deactivation of the fuel cell system;
power generation by said fuel cell is carried out under a condition that feed of at least one of said oxidizing gas and said fuel gas is stopped by said gas feed stopping means;
the electric power generated by said fuel cell is stored into said electric power storage means when said electric power storage means is not fully charged, and the storing of the electric power into said electric power storage means is stopped when at least one cell or cell group of said plurality of cells or cell groups is equal to or less than a predetermined voltage; and
the electric power generated by said fuel cell is consumed by said accessory when said electric power storage means is fully charged, and the consuming of the electric power by said accessory is stopped when at least one cell or cell group of said plurality of cells or cell groups is equal to or less than the predetermined voltage.

12. The fuel cell system in accordance with claim 11, wherein
an electric resistor connectable to said fuel cell is provided independently for each cell or cell group of said fuel cell, and
said electric resistor consumes the electric energy generated by said fuel cell under a condition that feed of gas is stopped.

13. The fuel cell system in accordance with claim 11, wherein
an electric resistor connectable to said fuel cell is provided, wherein said electric resistor includes one electric resistor being selectively connectable between at least two cells or cell groups of said fuel cell, and
said electric resistor consumes the electric energy generated by said fuel cell under a condition that feed of gas is stopped.

14. The fuel cell system in accordance with claim 11, wherein
an electric resistor connectable to said fuel cell is provided, and
when at least one cell or cell group of said plurality of cells or cell groups stops generating electric power, electric energy generated by other cells or cell groups is consumed by said electric resistor.

* * * * *